US012275628B2

(12) United States Patent
Bonanni et al.

(10) Patent No.: US 12,275,628 B2
(45) Date of Patent: Apr. 15, 2025

(54) HYDRAULIC UNIT FOR DISPENSERS OF CARBONATED WATER

(71) Applicant: ELTEK S.p.A., Casale Monferrato (IT)

(72) Inventors: Massimo Bonanni, Casale Monferrato (IT); Fabio Segalini, Casale Monferrato (IT); Gino Sibilia, Casale Monferrato (IT)

(73) Assignee: ELTEK S.p.A., Casale Monferrato (IT)

( * ) Notice: Subject to any disclaimer, the term of this patent is extended or adjusted under 35 U.S.C. 154(b) by 92 days.

(21) Appl. No.: 18/250,866

(22) PCT Filed: Sep. 15, 2021

(86) PCT No.: PCT/IB2021/058416
§ 371 (c)(1),
(2) Date: Apr. 27, 2023

(87) PCT Pub. No.: WO2022/090820
PCT Pub. Date: May 5, 2022

(65) Prior Publication Data

US 2023/0391600 A1 Dec. 7, 2023

(30) Foreign Application Priority Data

Oct. 30, 2020 (IT) ........................ 102020000025849

(51) Int. Cl.
*B67D 1/00* (2006.01)

(52) U.S. Cl.
CPC .......... *B67D 1/0071* (2013.01); *B67D 1/0063* (2013.01); *B67D 2210/0006* (2013.01); *B67D 2210/00062* (2013.01)

(58) Field of Classification Search
CPC ................ B67D 1/0071; B67D 1/0063; B67D 2210/0006; B67D 2210/00062
See application file for complete search history.

(56) References Cited

U.S. PATENT DOCUMENTS 5,792,391 A 8/1998 Vogel et al.
10,183,260 B2 1/2019 Wilder et al.
2024/0025720 A1 * 1/2024 Otto .................... B67D 1/1252

FOREIGN PATENT DOCUMENTS

WO 2015168290 A1 11/2015

OTHER PUBLICATIONS

International Search Report and Written Opinion of the ISA for PCT/IB2021/058416 mailed Jan. 18, 2022, 17 pages.

* cited by examiner

*Primary Examiner* — Vishal Pancholi
*Assistant Examiner* — Robert K Nichols, II
(74) *Attorney, Agent, or Firm* — Nixon & Vanderhye P.C.

(57) ABSTRACT

Hydraulic unit for a carbonation apparatus (2) having a carbonator (3) and a pump (10). The hydraulic unit (1) has a body made of polymeric material (20) defining a plurality of ducts (21-26), which comprise a duct (21) to convey water to the carbonator (3), a duct (22) to add a gas to the carbonator (3), and at least one duct to draw water (24, 25, 26) from the carbonator (3). The body made of polymeric material (20) can also define a fluidic connection interface (30), configured for mounting the body made of polymeric material (20) at at least one upper end (3 a) of the carbonator (3). The body made of polymeric material body (20) can also define at least one inlet ($23_{IN}$) and at least one outlet ($26_{OUT}$) configured for connection to an outlet (11*b*) and an inlet (11*a*), respectively, of the pump (10) of the carbonation device (2).

19 Claims, 31 Drawing Sheets

HYDRAULIC UNIT FOR DISPENSERS OF CARBONATED WATER

This application is the U.S. national phase of International Application No. PCT/IB2021/058416 filed Sep. 15, 2021, which designated the U.S. and claims priority to IT patent application No. 102020000025849 filed Oct. 30, 2020, the entire contents of each of which are hereby incorporated by reference.

FIELD OF THE INVENTION

The present invention refers in general to devices for dispensing carbonated water, preferably chilled and carbonated water, and has been developed with particular attention being paid to the connection systems used to interconnect certain functional components of such dispensing devices—such as for example a carbonator and a pump—between respective supply sources of water and gas, on the one hand, and members for dispensing water, carbonated water and/or cooled water, on the other hand.

BACKGROUND ART

Dispensing devices of the type indicated, such as those generally known as cooler-carbonators, are appliances designed for connection to a water supply source, such as a domestic drinking water network, and to a source of a pressurised gas, such as a cylinder containing carbon dioxide. These appliances are generally designed to allow to supply water at room temperature, chilled water and carbonated water. Generally, these devices are also designed to carry out a purification or filtration of the incoming water.

In general terms, the most important functional components of a cooler-carbonator comprise a pump, a water-cooling system and a water carbonator system, as well as a series of control devices, typically represented by solenoid valves.

The cooling system is usually represented by a classic refrigeration circuit, including a compressor, a condenser with a possible fan, a coil that acts as an evaporator, and an expansion valve or similar lamination member for the refrigerant.

The carbonation system typically comprises a so-called carbonator, i.e., a suitable container in which water and carbon dioxide are mixed, to provide carbonated water at the outlet. Given that a certain pressure is required to obtain the passage of water through the carbonator, the aforementioned pump is also provided. In various solutions, the coil of the refrigeration circuit is in direct contact with the outside of the carbonator, in order to cool the water contained thereinto: hence, in these solutions, the carbonator is exploited both to produce carbonated water and cooled water at the outlet.

As mentioned, the cooler-carbonator is supplied with water and carbon dioxide, to allow dispensing of water at room temperature, cooled water and carbonated water, through corresponding dispensing mouths that can be controlled selectively, typically through solenoid valves controlled by suitable keys. This implies that—at least as regards cooled water and carbonated water—the inlets of the cooler-carbonator connected to the water and gas sources must be connected to respective inlets of the carbonator, and that the outlets of the carbonator must be connected to the respective dispensing mouths of the cooler-carbonator.

These connections are traditionally made using flexible hoses, solenoid valves and bulk fitting components, that is, configured as separate components. Given the number of connections required between the water and gas inlets, the inlets and outlets of the carbonator, and the dispensing mouths, it is therefore necessary to prepare and use a lot of flexible hoses, even having different lengths, whose ends must also be equipped with the corresponding connection fittings: this determines the risk of incorrect connections and/or considerable construction times, as well as a significant occupation of space inside the cooler-carbonator. Given that the casing of the cooler-carbonator generally has small dimensions, particularly when intended for free-standing installation in household environments, the arrangement of the pipes is forcibly disordered, and complicates any subsequent maintenance operations, with the aforementioned risk of incorrect connections during production and/or maintenance. The solenoid valves, usually at least four, must be secured to the fixed structure of the cooler-carbonator, with further complications in terms of positioning and fixing, and production times. In addition to this, in view of the large number of connections made via bulk fittings, the risk of water leakage also increases correspondingly.

SUMMARY OF THE INVENTION

In its general terms, the present invention aims to solve one or more of the indicated drawbacks. This aim is attained, according to the invention, by a hydraulic group for a carbonator apparatus having the characteristics indicated in the claims, which constitute an integral part of the teaching provided herein in relation to the invention.

BRIEF DESCRIPTION OF THE DRAWINGS

Further aims, characteristics and advantages of the invention will be clear from the detailed description which follows, made with reference to the attached schematic drawings, wherein.

DESCRIPTION OF EMBODIMENTS OF THE INVENTION

Reference to "an embodiment" or "one embodiment" in the framework of this description is intended to indicate that a particular configuration, structure, or characteristic described in relation to the embodiment is comprised in at least one embodiment. Hence, phrases such as "in an embodiment", "in one embodiment", or the like that may be present in various points of this description do not necessarily refer to one and the same embodiment. Furthermore, particular conformations, structures, or characteristics defined in the framework of this description may be combined in any adequate way in one or more embodiments, even different from the ones represented. The reference numbers and spatial references (such as "upper", "lower", "top", "bottom", etc.) used herein are provided merely for convenience and hence do not define the sphere of protection or the scope of the embodiments. In the present description and in the attached claims, the definition "hydraulic unit", referred to the object of the invention, is meant to designate an accessory component for fluidic connection for the carbonator apparatus, in particular intended to be mounted and fixed on a carbonator of said apparatus, but which does not constitute a constructive part thereof. In this perspective, the hydraulic unit described hereinafter does not perform the functions of a sealing lid or closure cap of a carbonator, but is instead intended to be set above such a lid or cap.

In the present description and in the attached claims, the generic term "material" shall be understood as including mixtures, compositions or combinations of several different materials. The same reference numbers are used in the figures to indicate similar or technically equivalent elements.

Figure 1:
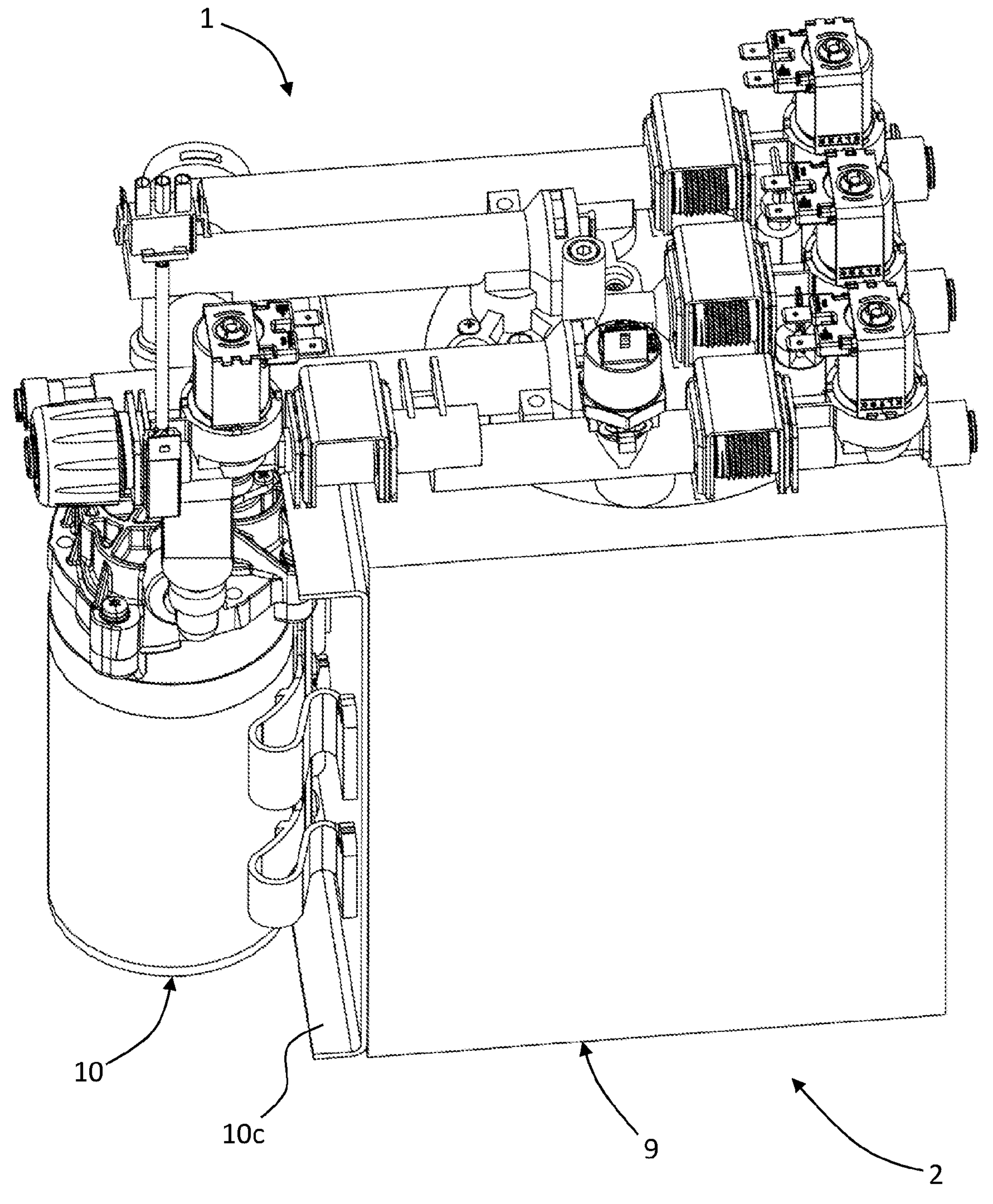
FIGS. 1 and 2 are schematic perspective views of some components of a carbonator apparatus using a hydraulic unit according to possible embodiments.
Figure 2:
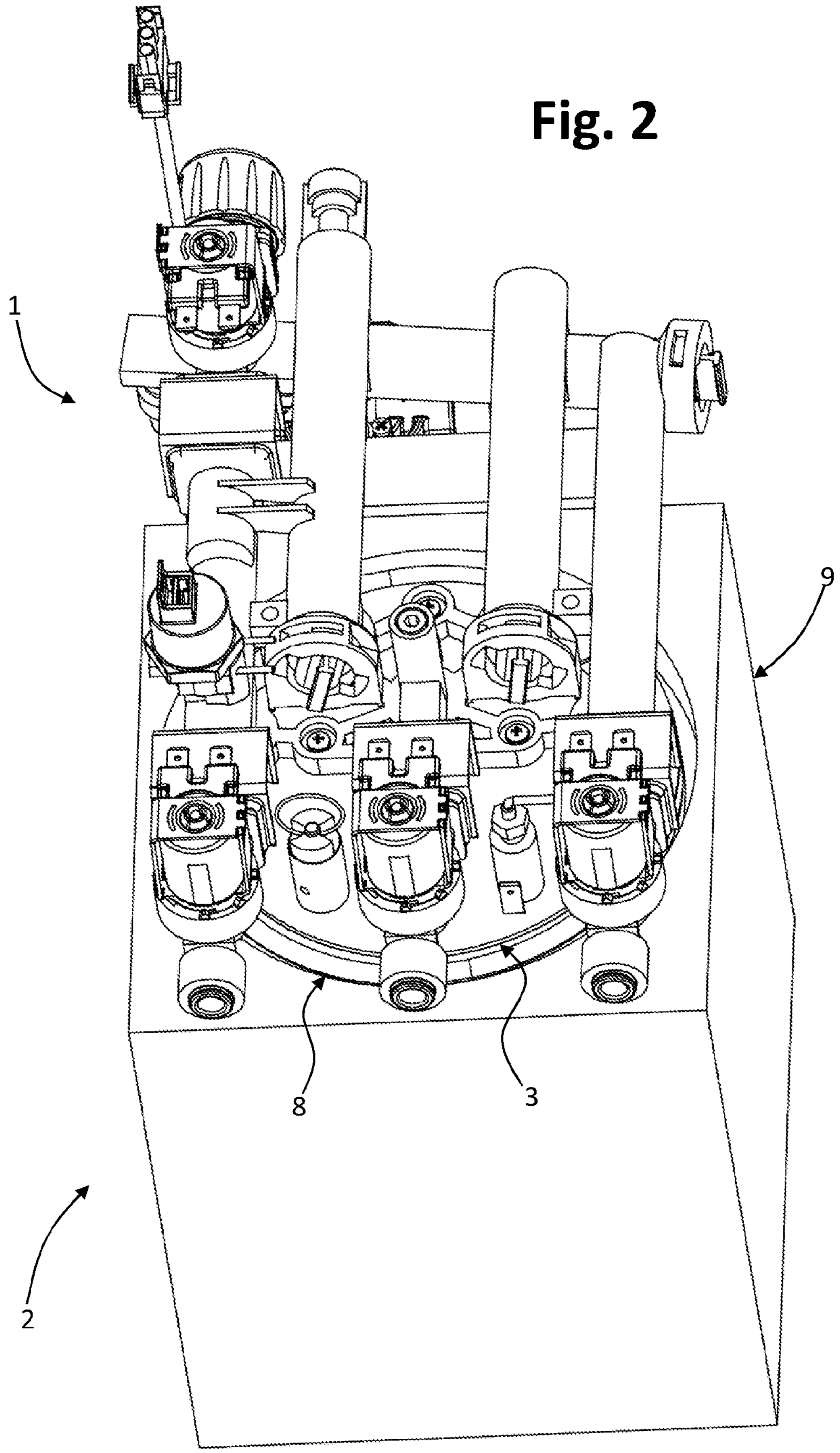

In FIGS. 1 and 2 there is represented in schematic form a hydraulic unit according to the invention, indicated as a whole with 1, associated with a carbonator apparatus, here represented by a dispenser 2 of chilled and carbonated water, in particular a cooler-carbonator; the dispenser 2 is illustrated only with reference to the components thereof useful for the understanding of the present invention. In the example, the dispenser 2 includes a carbonator 3, a coil 8 for a coolant fluid and an insulation body 9, here generally parallelepiped in shape.

The dispenser further comprises a pump, indicated with 10. In various embodiments, as it can be noted in FIG. 1, a vertical face of the insulation body, here conventionally defined as the rear face, has associated thereto a metal plate 10*c*, the pump 10 being fixed to this plate by means of brackets 12.

Figure 3:
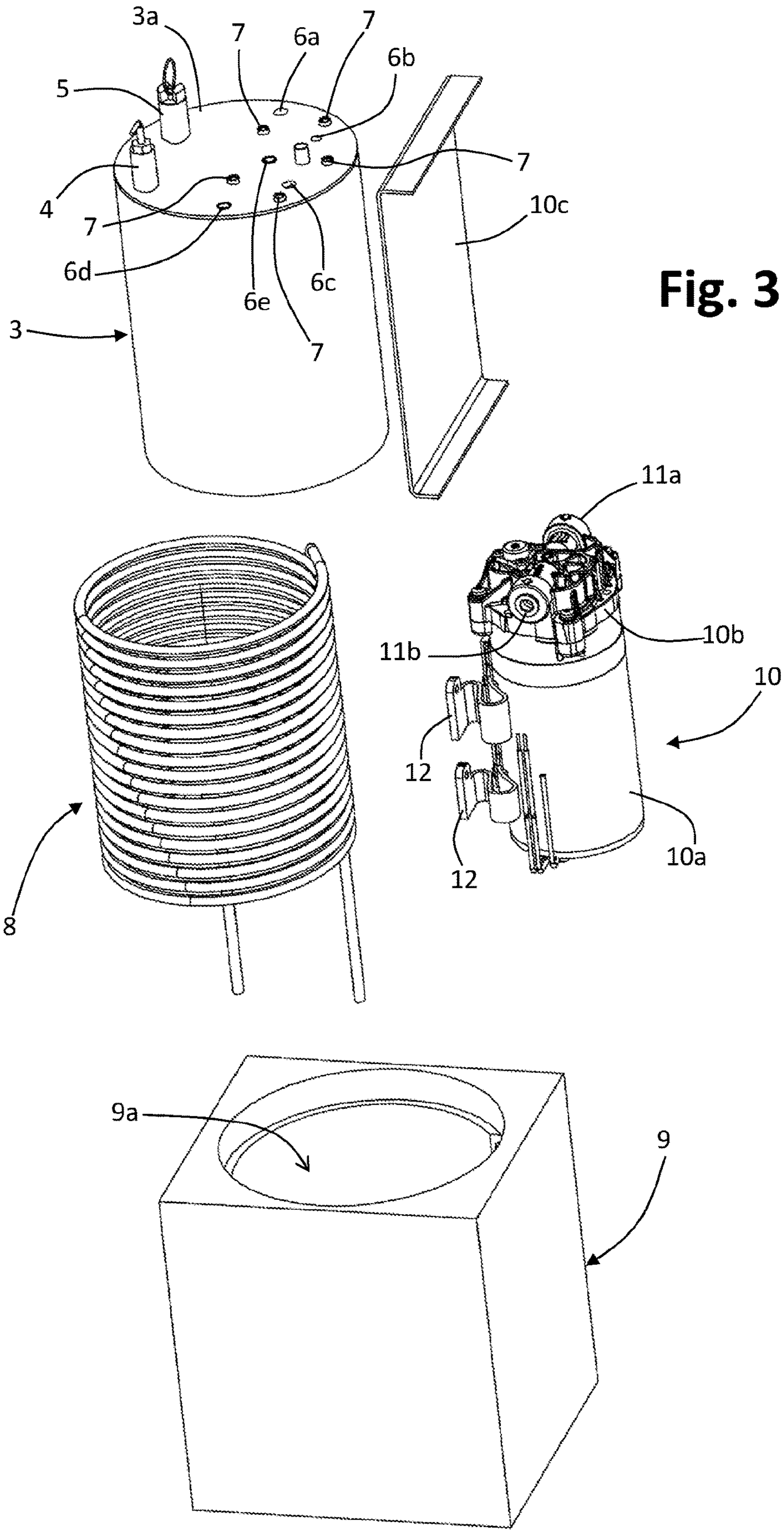
FIG. 3 is a schematic exploded view of some components of a carbonator apparatus.

Referring also to FIG. 3, the pump 10, of a per se known conception, has a body 10*a* provided with a head 10*b*, in which a suction inlet 11*a* and a delivery outlet 11*b* are defined. The insulation body 9, made for example with a heat-insulating material and/or structure, such as a foamed material, defines a cavity 9*a*, within which the coil 8 extends, here substantially wound according to a cylindrical helix. The coil 8 acts as an evaporator and belongs, in a known way, to a refrigeration circuit which includes, for example—not represented—a compressor, a condenser with a possible fan, and a possible lamination member for the refrigerant fluid, as well as a possible control circuit.

The carbonator 3 has, in the example, an overall cylindrical shape and is inserted into the helix defined by the coil 8, in contact therewith, in order to enable to cool the water contained in the carbonator: for this reason, the body of the carbonator 3, or at least its peripheral wall, is preferably made of a material having a high heat transfer capacity, for example a metal, such as steel: in the example of implementation described here the carbonator 3 is used both to produce carbonated water, and to produce chilled water, as described below.

At the upper end 3*a* of the carbonator 3, here defined at least in part by a wall preferably made of metal, a level probe 4 and a safety valve 5 are mounted, both of conception and operation in themselves known, and therefore not described in detail herein. The level probe 4 has essentially the function of avoiding complete filling of carbonator 3 with water, that is, keeping the upper part of the carbonator free, so as to ensure a gas atmosphere—in particular carbon dioxide—at medium pressure (for example 2-5 bar), for the reasons described below. The safety valve 5 operates instead as a vent, that is, it opens if, for any reason, inside the carbonator 3, a pressure is established above a predetermined safety threshold (for example about 8 bar).

At the upper end 3*a* of the carbonator 3, i.e., at its upper closing wall, a series of inlets and outlets are defined, and in particular:

- a first inlet 6*a*, for introduction of water—possibly previously filtered—from a water supply source, for example a domestic drinking water network, not represented;
- a second inlet 6*b*, for the introduction of a gas from a relevant supply source, such as a carbon dioxide cylinder, not represented,
- a third inlet 6*c* for pressurized water, that is, water forced by pump 10;
- a first output 6*d*, for the release of chilled water, and
- a second outlet 6*e*, for the release of carbonated water.

The functions of the aforementioned inlets 6*a*-6*c* and the aforementioned outlets 6*d*-6*e* will be discussed in detail later.

Preferably, the upper end or wall 3*a* of the carbonator 3 also defines or has associated thereto elements 7 for the mechanical fastening of group 1, as described below. Such elements may, for example, include shaped metal elements, sealingly inserted into corresponding through openings of the end 3*a* starting from the lower side thereof, which are provided with a blind hole with a female thread, in order to allow fixing with screws of the unit 1 (see for example FIGS. 13, 15 and 21, where some of the aforementioned fixing screws are indicated with V). In use, the accessory unit 1 is therefore fixed above the upper wall 3*a* of the carbonator 3.

Figure 4:
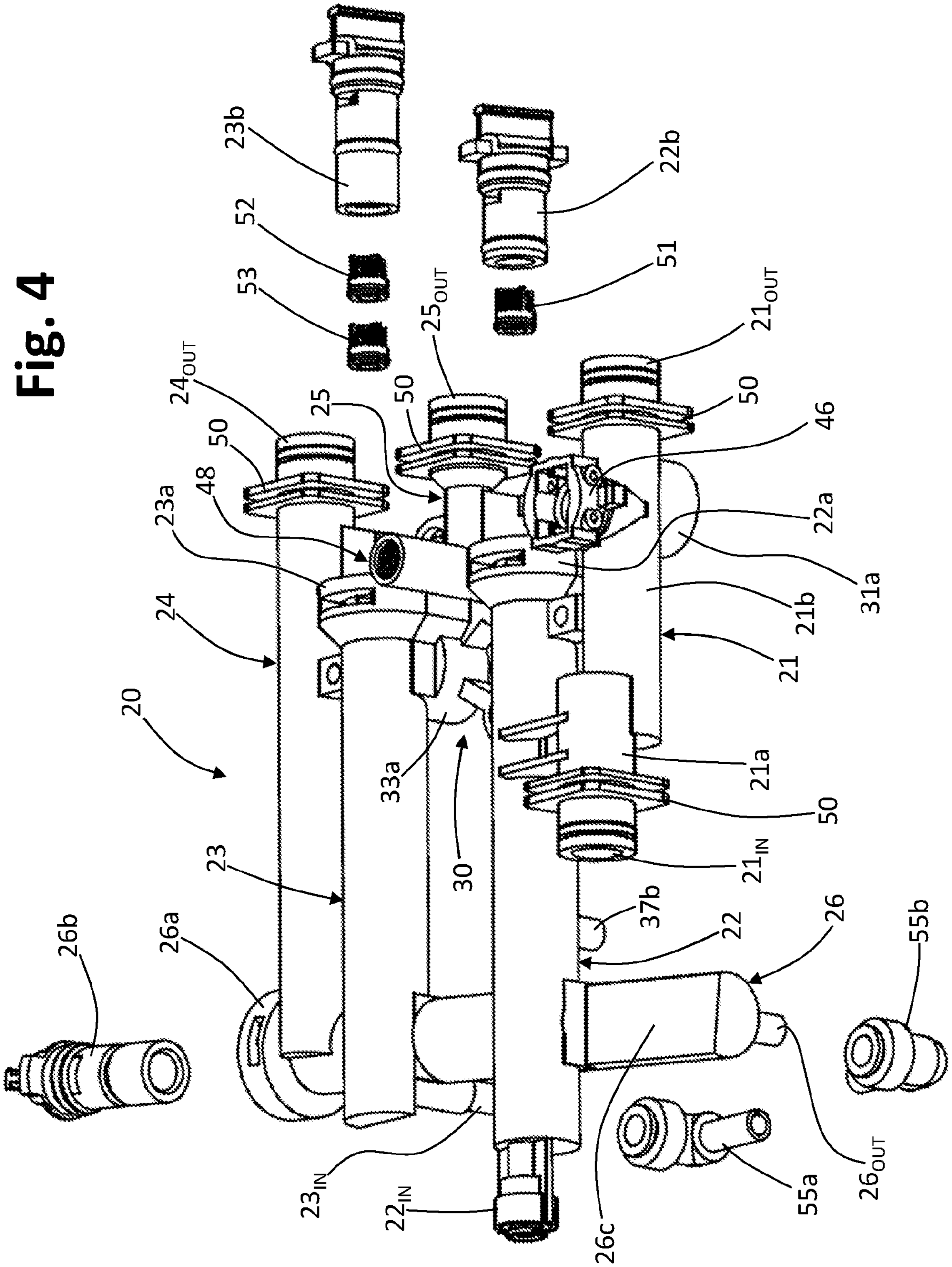
FIG. 4 is a schematic perspective view of a body of a hydraulic unit according to possible embodiments, with some functional complements represented in exploded way.

In FIG. 4 the main body of the unit is visible, according to possible embodiments, indicated with 20 as a whole, which is in particular a relatively rigid body of polymeric material (without prejudice to a possible limited intrinsic elasticity of the material in question). The polymer body 20 can be formed by injection moulding of at least one polymer; the preferred material is a thermoplastic material, for example PA66 or PPO, possibly filled with glass fibres (for example about 30%). The body 20 is a distinct component with respect to the carbonator 3, and in particular with respect to its upper closing wall having the aforementioned inlets 6*a*-6*c* and the aforementioned outlets 6*d*-6*e*. The body 20 is prearranged for fixing on the carbonator 3, but it does not constitute a constructive element thereof.

In various embodiments, the body 20 defines a plurality of ducts in a single body. The definition of "single body" is here intended to comprise both the case of a body formed in a single relatively stiff piece, and the case of a body formed by a number of relatively stiff pieces coupled or fixed together, for example welded, or glued, or engaged, or hooked together.

In various embodiments, the body 20 is provided with a plurality of ducts configured for hydraulic connection between the carbonator and the pump of the carbonator apparatus 2.

In various preferential embodiments, the aforesaid ducts comprise at least one duct for supplying water to the carbonator 3, one duct for supplying a gas to the carbonator 3, and at least one duct for withdrawing water from the carbonator 3.

In various embodiments, the body 20 defines or has associated thereto a connection interface, which is configured for connection with the carbonator 3, in particular for fluidic connection at the upper end or wall 3*a* of the carbonator, preferably for both fluidic connection and mechanical connection. In various preferential embodiments, the connection interface has at least one water outlet configured for fluidic connection to a water inlet of the carbonator, one gas outlet configured for fluidic connection to a gas inlet of the carbonator 3, and at least one water inlet configured for fluidic connection to a water outlet of the carbonator 3. The aforementioned connection interface is defined at one side of the accessory hydraulic unit 1, here conventionally referred to as "lower side", which is intended to face and/or rest on the upper surface of the wall 3*a* of the carbonator 3.

Preferably, the body 20 also defines a suction outlet configured for fluidic connection with the inlet 11*a* of the pump, and a delivery inlet configured for fluidic connection with the outlet 11*b* of the pump (10).

In various preferential embodiments, such as that represented, the body 20 defines in a single piece or body the aforementioned plurality of ducts and the aforementioned connection interface, the latter being indicated as a whole by 30.

The body 20 defines a plurality of inlets and outlets for the aforementioned ducts which, in various embodiments, are selected from the following:

- a first water supply inlet, designed for fluidic connection with the aforementioned water supply source,
- a second gas supply inlet, designed for fluidic connection with the aforementioned gas supply source,
- a water delivery inlet, designed for fluidic connection with the outlet 11*b* of the pump 10,
- a water suction outlet, designed for fluidic connection with the inlet 11*a* of the pump 10,
- a first dispensing outlet for water which is not treated within carbonator 3, i.e., water not cooled and/or water not carbonated,
- a second dispensing outlet, for cooled water, and
- a third dispensing outlet, for carbonated water.

In various embodiments, the first supply inlet has associated thereto a respective valve assembly, which may include at least an impeller of a flow meter, and/or at least one of the first dispensing outlet, the second dispensing outlet and the third dispensing outlet has associated thereto a respective valve assembly. For this purpose, in various embodiments, the body of polymeric material defines, near a longitudinal end of at least one duct of the plurality of ducts, at least one element for the mechanical fastening of a respective valve assembly.

In various embodiments, the water delivery inlet and the water suction outlet generally extend parallel to each other and have respective ends that lie substantially according to one and the same plane. In accordance with other embodiments, the water delivery inlet and the water suction outlet can be differently oriented, for example arranged substantially orthogonal to each other, for example with the aforementioned delivery inlet which is generally parallel to the aforementioned dispensing outlets, and with the aforementioned suction outlet extending upwards, at the upper side of the body 20 of the unit 1.

Referring in particular to the non-limiting example shown in FIG. 4, the plurality of ducts comprises:

- a first tubular duct 21, having the aforementioned first supply inlet, indicated with $\mathbf{21}_{IN}$, and the aforementioned first dispensing outlet, indicated with $\mathbf{21}_{OUT}$,
- a second tubular duct 22, having the aforementioned second supply input, indicated by $\mathbf{22}_{IN}$,
- a third tubular duct 23 for the introduction of pressurized water into the carbonator 3, having the aforementioned delivery inlet, indicated by $\mathbf{23}_{IN}$,
- a fourth tubular duct 24, having the aforementioned second dispensing outlet, indicated by $\mathbf{24}_{OUT}$, susceptible of fluidic connection with the inlet 11 of the pump 10, and
- a fifth tubular duct 25, having the aforementioned third dispensing outlet, indicated with $\mathbf{25}_{OUT}$.

In various embodiments the plurality of ducts also includes a sixth tubular duct 26, having the aforementioned suction outlet, indicated with $\mathbf{26}_{OUT}$, wherein this sixth tubular duct 26 is in fluid communication with the fourth tubular duct 24.

Preferably, one or more of the first tubular duct 21, the second tubular duct 22, the third tubular duct 23, the fourth tubular duct 24 and the fifth tubular duct 25 extend substantially parallel or side by side, as in the non-limiting example shown, in the longitudinal direction of the unit (i.e., transversely or orthogonally with respect to an axis of the carbonator 3).

It should be noted that the plurality of ducts may include a different number of ducts selected from those exemplified above, for example depending on the functional constructional characteristics of the dispenser.

In various embodiments, at least one duct of the plurality of ducts defines, at one end thereof, a positioning site for a plug. In embodiments of the type exemplified in FIG. 4:

- duct 22 defines, at its axial end generally opposite the second supply inlet $\mathbf{22}_{IN}$, a positioning seat 22*a* for a 22*b* plug, and/or
- duct 23 defines, at its axial end generally opposite the delivery inlet $\mathbf{23}_{IN}$, a positioning seat 23*a* for a plug 23*b*, and/or
- duct 26 defines, at its axial end generally opposite the suction outlet $\mathbf{26}_{OUT}$, a positioning seat 26*a* for a plug 26*b*.

Also in this case, the number of ducts equipped with a plug may vary, for example depending on the functional constructional characteristics of the dispenser. The arrangement of the seats 22*a*, 23*a* and the corresponding plugs 22*b*, 23*b* may also be different from that exemplified.

Each plug can also be formed with polymeric material, for example injection moulded, and have associated thereto one or more sealing elements, for example ring seals. The plug and its seat can be configured for mutual coupling, for example by means of a bayonet coupling, as in the case exemplified in the figure, or by a thread, or by means of pins.

In various embodiments, one or more ducts defined by the body 20 is/are equipped with at least one non-return valve. In various preferential embodiments:

- at least one respective non-return valve is arranged within the gas supply duct, in an intermediate position between the inlet and outlet thereof, which is preferably mounted in a plug occluding said cited duct at an axial end thereof, and/or
- at least one respective non-return valve is arranged within a duct for the introduction of pressurized water into the carbonator, in an intermediate position between an inlet and an outlet thereof, which is preferably be mounted in a plug occluding said duct at an axial end thereof.

Referring to FIG. 4, 51 indicates a non-return valve, of a design known per se, which is associated with the plug 22*b* of the duct 22, for the purposes described below. With 52 and 53 are indicated two additional non-return valves, associated in series with the plug 23*b* of the duct 23, for the purposes described below.

In various embodiments, the body 20 have associated thereto connecting elements, for connecting the unit 1 to a pump. In various preferential embodiments, the delivery inlet and the suction outlet of the polymeric body have associated thereto respective connection fittings, configured for connection to the outlet and inlet of the pump. Referring to FIG. 4, with 55*a* and 55*b* are indicated two connecting elements, in particular elbow-shaped, designed for coupling with the delivery inlet $\mathbf{23}_{IN}$ of duct 23 and with the suction outlet $\mathbf{26}_{OUT}$ of duct 26, configured for connection to the outlet 11*b* and the inlet 11 of the pump 10, as described below. Fittings 55*a* and 55*b* can also me made of a rigid polymeric material.

The delivery inlet and the suction outlet, with the possible associated fittings, obtains an interface arrangement configured for connection with the pump. In other embodiments, the delivery inlet and the suction outlet of unit 1 can be connected to the pump outlet and inlet, respectively, by means of pipes, for example pipes at least partly flexible, as exemplified in the following in relation to possible variants embodiments.

In various preferential embodiments, such as the one exemplified, at least some ducts (in the example ducts 21-25), preferably substantially straight or including substantially straight sections, extend substantially parallel to each other. In various embodiments, a number of ducts extend in one and the same first direction, for example, a longitudinal direction of the body 20 (like ducts 21-25 of the example); one or more additional ducts, if provided, may extend in a second direction, for example a transverse direction with respect to the first direction (such as duct 26).

Preferably, the sixth tubular duct 26—if it is present—extends in a transverse or angled direction with respect to one or more other ducts of the body 20, such as the ducts 21-25, preferably in a lower position than at least the ducts 22-25.

In various embodiments, duct 26, if present, extends in a transverse or angled direction relative to other ducts of the body 20, such as ducts 21-25. In the non-limiting example shown, duct 26 does not extend below duct 21, as the duct 21 has a reduced longitudinal development, for the purpose of mounting a valve assembly, as explained hereinafter. In order to facilitate the assembly of such valve assembly, without increasing the overall dimensions of the group 1, in various embodiments the duct 21 has two portions 21*a* and 21*b* that extend axially at different heights: in the case exemplified, the portion 21*a* defining the inlet $\mathbf{21}_{IN}$ extends at a greater height than the portion 21*b* defining the outlet $\mathbf{21}_{OUT}$. More in general, in various embodiments, at least one duct of the body 20 has at least one first portion and a second portion that extend axially at different heights.

From FIG. 4 it can be seen that, in various embodiments, the dispensing outlet $\mathbf{21}_{OUT}$, $\mathbf{24}_{OUT}$ and $\mathbf{25}_{OUT}$ are at one and the same first longitudinal end region of the body 20, preferably substantially flush with each other, i.e., with the corresponding ends that lie substantially according to one and the same plane; on the other side, the supply inlet $\mathbf{22}_{IN}$ is at the opposite end region of the body 20, to which also the inlet $\mathbf{21}_{IN}$ is oriented to.

Preferably, the inlets $\mathbf{21}_{IN}$ and $\mathbf{22}_{IN}$, on the one hand, and the outlets $\mathbf{21}_{OUT}$, $\mathbf{24}_{OUT}$ and $\mathbf{25}_{OUT}$, on the other hand, extend according to substantially parallel axes, or side by side.

On a preferential basis, the suction outlet $\mathbf{26}_{OUT}$ and the delivery inlet $\mathbf{23}_{IN}$ are substantially at one and the same end region of the body 20 where the inlet $\mathbf{22}_{IN}$ is located, in order to facilitate connection to the pump 10, as described below. In order to facilitate the connection to the pump 10, the inlet $\mathbf{23}_{IN}$ and the outlet $\mathbf{26}_{OUT}$ extend preferably generally parallel to each other and have respective ends that lie substantially according to one and the same plane. Preferably, inlet 23N and outlet $\mathbf{26}_{OUT}$ extend axially in an angled or inclined direction, for example substantially perpendicular, with respect to the direction of extension of the ducts 21-25, at the lower side of the body 20. In any case, as already indicated, the suction outlet $\mathbf{26}_{OUT}$ and the delivery inlet $\mathbf{23}_{IN}$ can be differently arranged and oriented, in particular in the case of connection to the pump 10 by means of pipes, for example flexible pipes.

In various embodiments, at least one duct of the plurality of ducts defines, in the vicinity of a respective longitudinal end, at least one element for the mechanical fastening of a respective valve assembly, in particular a substantially flange element. In various embodiments, such as the one exemplified in the figures, the tubular duct 21 is shaped to define, near its inlet $\mathbf{21}_{IN}$ and its outlet $\mathbf{21}_{OUT}$, respective mechanical fixing elements 50. Similarly, ducts 24 and 25 are shaped to each define, near the respective outlets $\mathbf{24}_{OUT}$ and $\mathbf{25}_{OUT}$, similar mechanical fixing elements 50. Preferably, the fixing elements 50 have a substantially standard conformation for coupling with commercially available valve assemblies. For this purpose, in the example shown, the elements 50 are generally flange-shaped, and comprise in particular two substantially parallel flanges, to define a groove or engagement seat therebetween for a mechanical fixing member, described below: such a conformation is for example suitable for coupling to solenoid valves as used in the field of household appliances.

In various embodiments, body 20 is shaped to define at least one seat for a sensor or transducer, such as a seat for a pressure transducer. With reference again to FIG. 4, in the case exemplified such seat—indicated by 46—is defined at duct 21, in a position intermediate to the inlet $\mathbf{21}_{IN}$ and the outlet $\mathbf{21}_{OUT}$. In various embodiments, the body 20 is shaped so as to define at least one seat for a flow regulator; in the case exemplified in FIG. 4, this seat—indicated by 48—is defined at duct 25, in particular at one of its inlets, as described hereinafter. Preferably each seat 46 and/or 48 is defined at one and the same side of the body 20, for example the upper side, and extends axially in a direction substantially inclined or perpendicular with respect to the direction of extension of other ducts, here the ducts 21-25.

In general, in various embodiments, the body of polymeric material defines at least one of a seat for a pressure transducer and a seat for a flow regulator. Preferably:

- the seat for the pressure transducer is defined along the duct for supplying water to the carbonator (here the duct 21), in an intermediate position between the first supply inlet and the first dispensing outlet, and/or
- the seat for the flow regulator is defined at an inlet for carbonated water defined in the polymer body.

Figure 5:
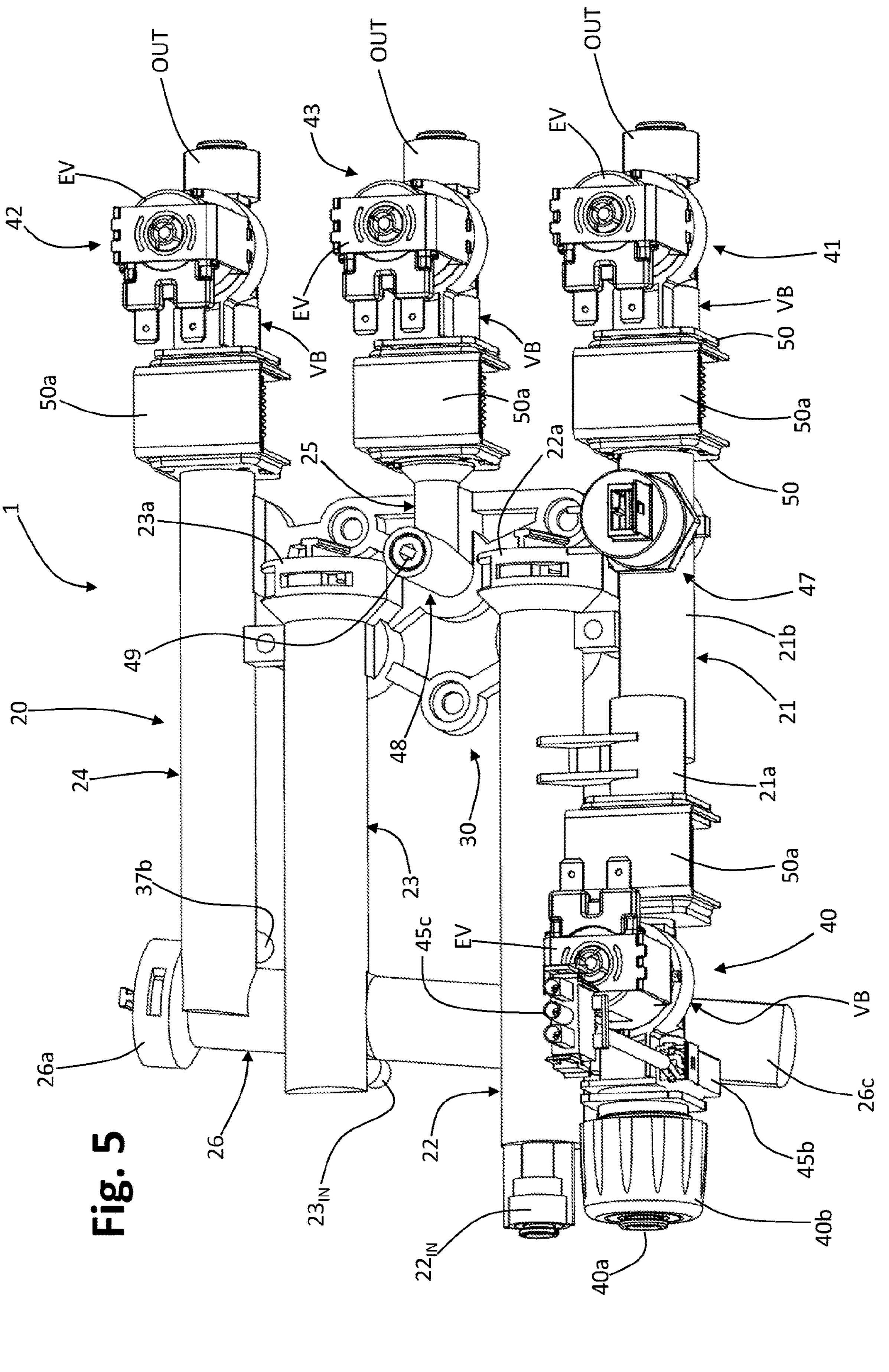
FIGS. 5 and 6 are schematic perspective views, respectively from above and below, of a hydraulic unit in accordance with possible embodiments.
Figure 6:
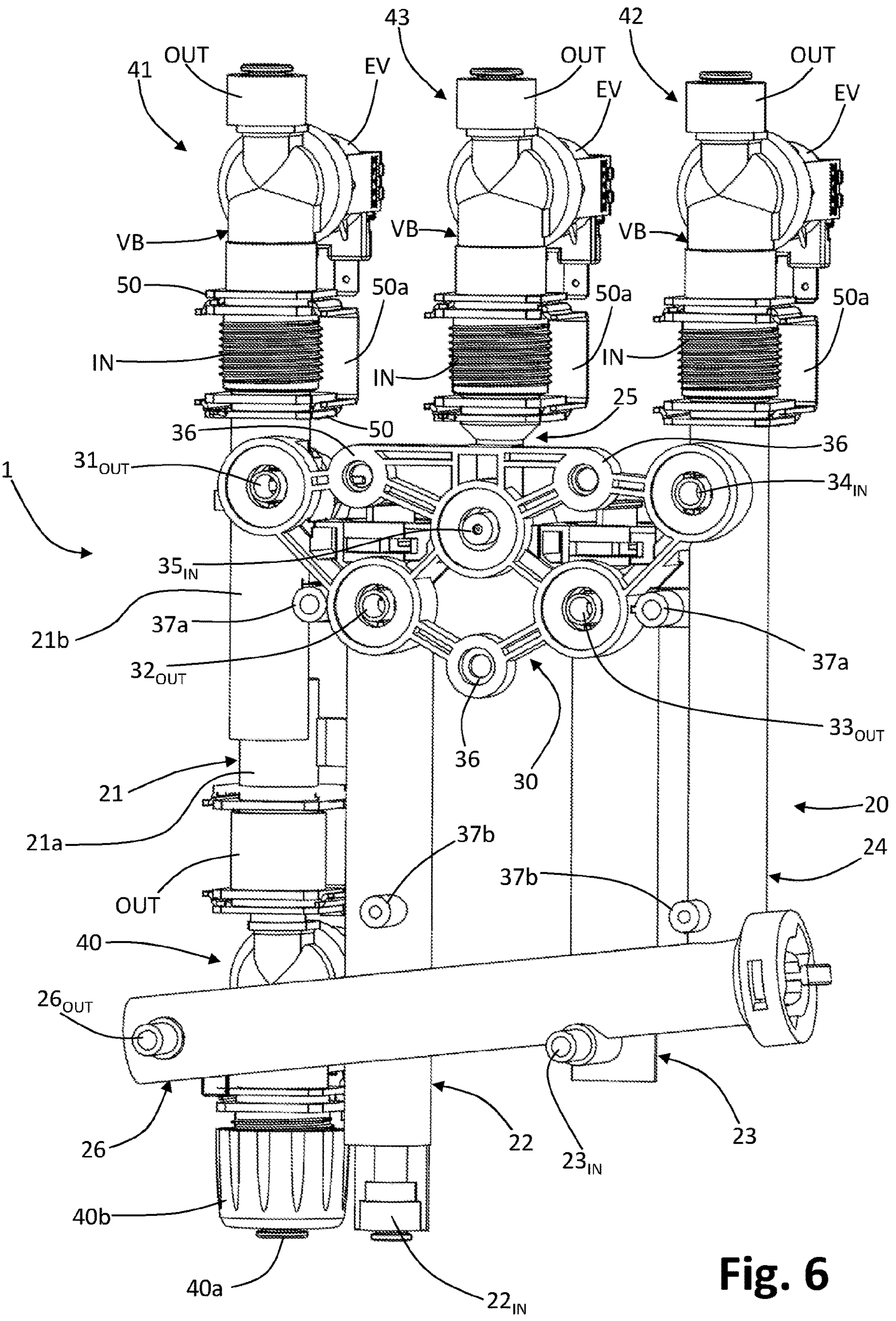

In FIGS. 5 and 6 the hydraulic unit 1 is shown in different views, with associated respective functional control elements, which comprise a plurality of valve assemblies, and preferably the aforementioned pressure transducer and flow regulator. The various components of the unit 1 are represented in an exploded view in FIG. 7.

Figure 7:
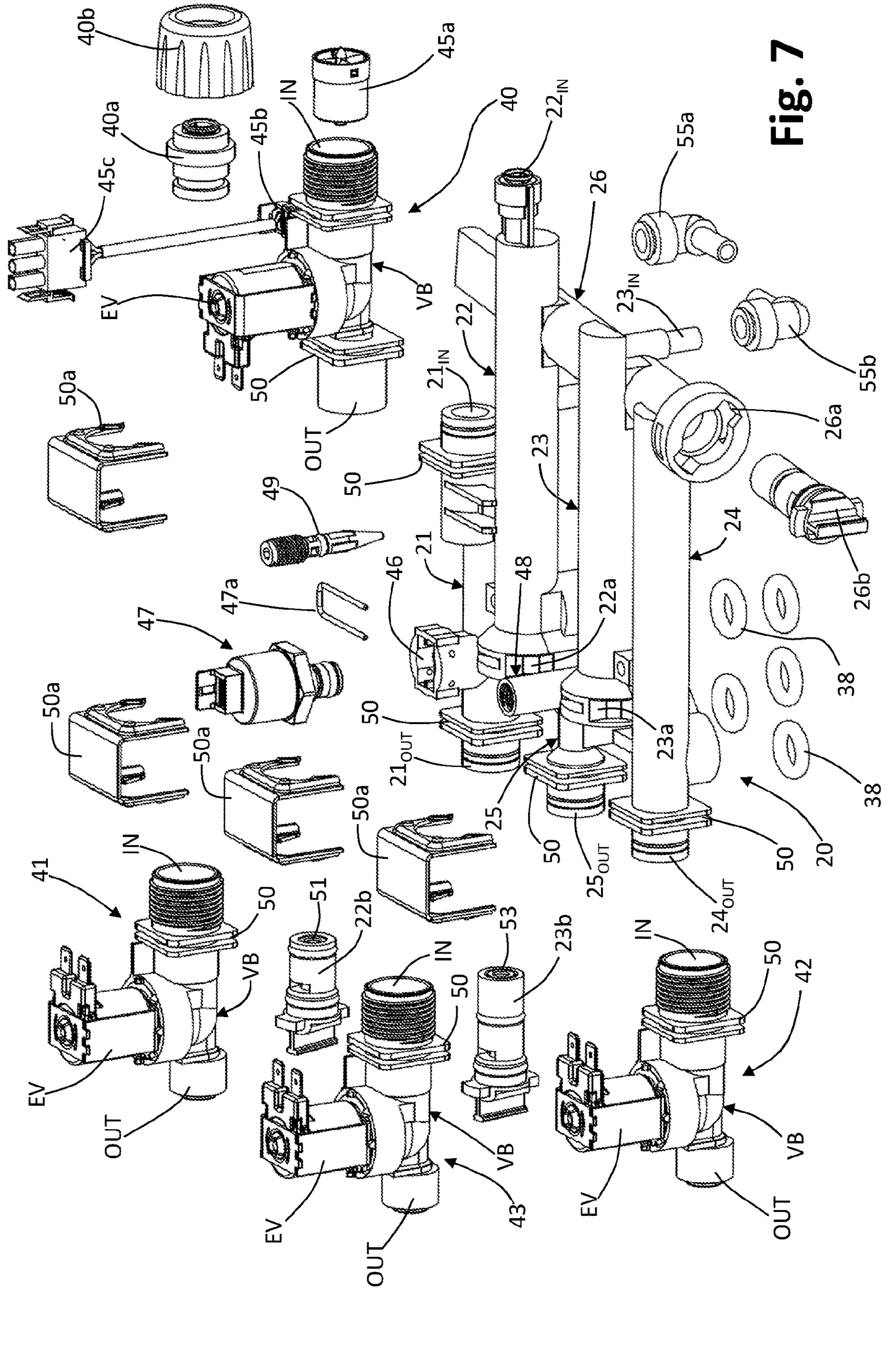
FIG. 7 is an exploded view of a hydraulic unit according to possible embodiments forms of implementation.

In various embodiments, the first supply inlet $\mathbf{21}_{IN}$ of the body 20 has associated thereto a respective valve assembly. Similarly, at least one of the first dispensing outlet $\mathbf{21}_{OUT}$, the second dispensing outlet $\mathbf{24}_{OUT}$ and the third dispensing outlet $\mathbf{25}_{OUT}$ has associated thereto a respective valve assembly. In FIGS. 5-7, with 40 is indicated a valve assembly associated with the inlet $\mathbf{21}_{IN}$, while with 41, 42 and 43 are indicated valve assemblies associated with the outputs $\mathbf{21}_{OUT}$, $\mathbf{24}_{OUT}$ and $\mathbf{25}_{OUT}$, respectively.

As is can be noticed, each valve assembly has a respective valve body VB, preferably made of plastic material, having an internal passage that defines a valve inlet IN and a valve outlet OUT. On the valve body VB, in an intermediate position of said passage, an electric actuator is mounted, preferably a solenoid one, with a respective known valve mechanism associated thereto, not visible. Assemblies 41-43 may consist of solenoid valves of a known design, for example of the unbalanced type, widely known in the field of household appliances.

As it can be guessed, particularly from the exploded view of FIG. 7, the inlets IN of the valve assemblies 41, 42 and 42 are sealingly coupled to the respective outlets $\mathbf{21}_{OUT}$, $\mathbf{24}_{OUT}$ and $\mathbf{25}_{OUT}$ of the ducts 21, 24 and 25, which are for the purpose preferably provided with seats for respective sealing rings (visible in the figure, but not indicated by reference numerals); similarly, the outlet OUT of the valve assembly 40 is sealingly coupled to the inlet $\mathbf{21}_{IN}$ of duct 21, also preferably provided with one or more seats for respective sealing rings.

As it can be seen, the bodies EV of the assemblies 40-43 are equipped with fixing elements 50 of a type substantially similar to those provided near the ends of the ducts 21, 23 and 25. In this way, the assemblies 40-43 can be coupled to the ends of such ducts 21, 23 and 25 using fixing elements, represented here by interlocking brackets, indicated with 50*a*, having a generally U-shaped conformation, for bridge-engagement between the elements 50 of the aforementioned ducts 21, 23, 25 and the elements 50 of the aforementioned valve bodies EV. The coupling between the bodies EV of the valve assemblies and the bodies of the ducts could also be of a different type.

In various embodiments, the hydraulic unit 1 is equipped with a flow meter, for example, integrated into one of the valve assemblies. The integration in the unit 1 of such a meter can be useful for the dosage of the amount of water to be dispensed, for example for the purpose of automatic filling of a glass or a carafe or bottle.

In the case exemplified in the figures, such a meter is integrated into the valve assembly 40; in the example, an impeller indicated with 45*a* in FIG. 7 is rotatably mounted within the inner duct of the corresponding body EV. According to a well-known technique, the impeller 45*a* includes an element, for example a magnet, capable of exciting an external detector 45*b*, for example a magnetic sensor, mounted on the outside of the valve body EV of the assembly 40 in the corresponding position, and having associated thereto a connection wiring 45*c*. The rotation of the impeller 45*a* caused by the water in transit determines the periodic passage of the magnet at the detector 45*b*, which generates at output a number of pulses in the unit of time which is a function of the rotation speed of the same impeller, and hence a function of the water flow rate.

In the exemplified case, the inlet IN of assembly 40 has associated thereto a quick-coupling module 40*a*, via a ring nut 40*b*; such a quick-coupling can be of any type, for example of the type known commercially as Speedfit™ (John Guest Ltd). The inlet $\mathbf{22}_{IN}$ can also be configured or equipped with a similar quick coupling, as well as the outlets of the valve assemblies 41, 42 and 43.

In various embodiments, the duct 21 has a comparatively reduced length development with respect to one or more of the other ducts parallel thereto. As indicated, moreover, the duct 21 has two portions 21*a* and 21*b* at different heights, i.e., staggered, and does not extend above the duct 26. This conformation can be adopted to enable coupling of the valve assembly 40 to the inlet $\mathbf{21}_{IN}$, while reducing the overall dimensions in length and height of the hydraulic unit 1; as can be seen, for example in FIGS. 5-6, in this way the quick coupling 40*a* associated with the valve assembly 40 is preferably substantially flush with the quick coupling that obtain the inlet $\mathbf{22}_{IN}$.

From FIGS. 5-6 and 9-10, for example, it is possible to see how the body of the assembly 40 extends above the transverse duct 26, axially aligned with the portion 21*a* of the duct 21, and how, in order to facilitate this positioning, at least one portion 26*c* of the transverse duct 26 can have a substantially semi-cylindrical passage section; this portion 26*c* can also extend below duct 22 (see for example FIG. 11).

Figure 14:
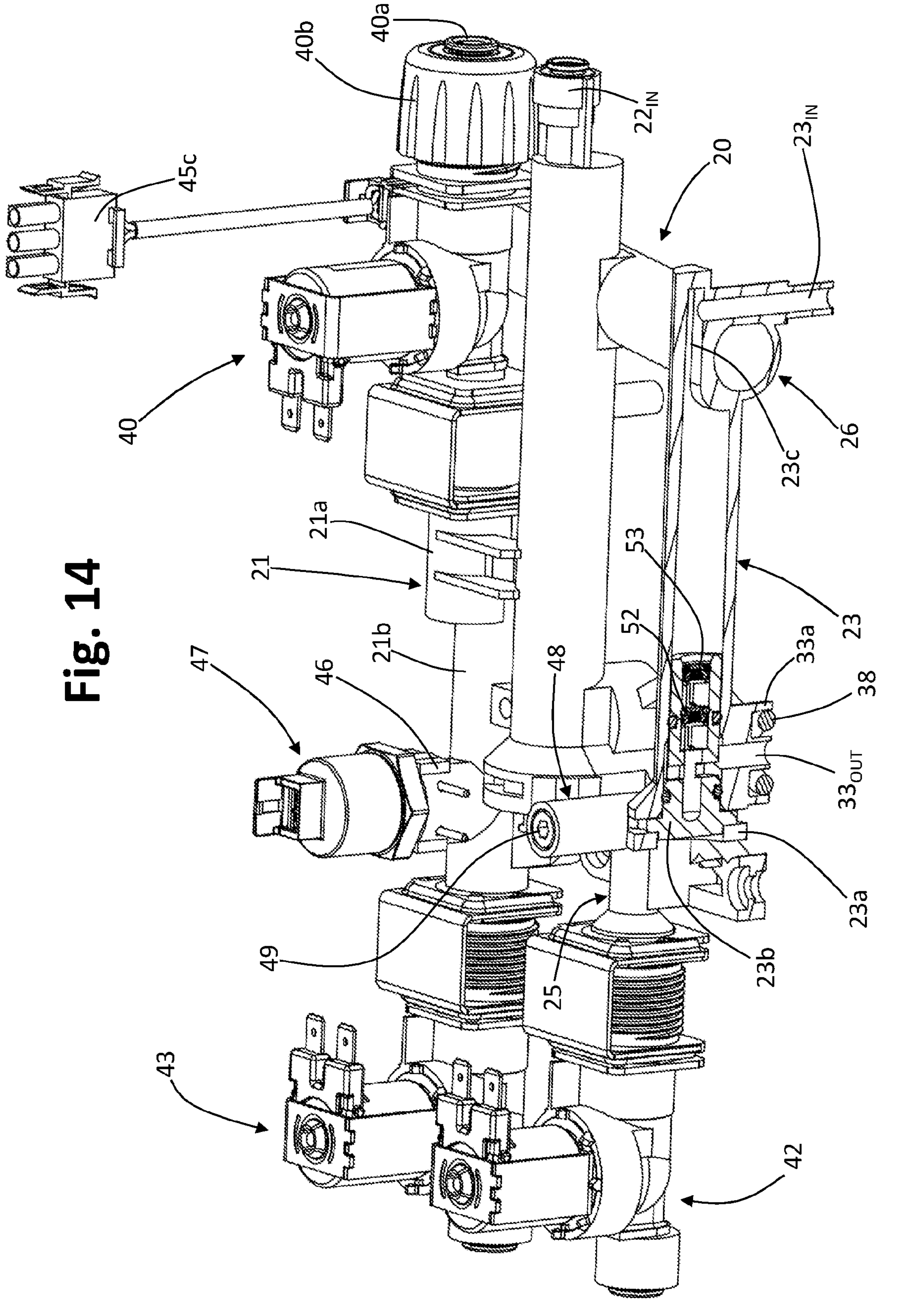
FIG. 14 is a fourth sectional schematic perspective view of a hydraulic unit according to possible embodiments.
Figure 16:
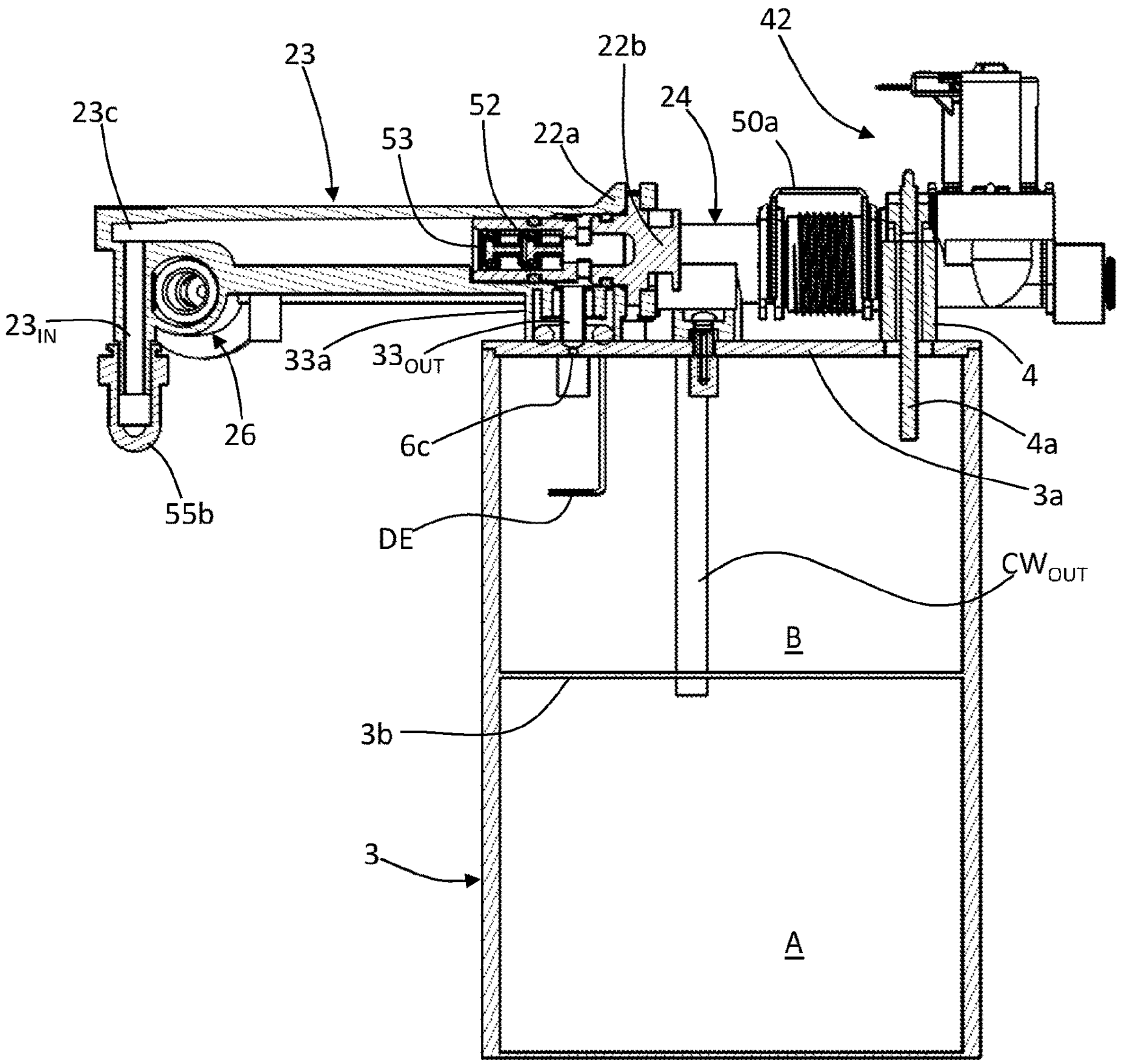
FIG. 16 is a third schematic section of a hydraulic unit according to possible embodiments, associated with a carbonator.
Figure 18:
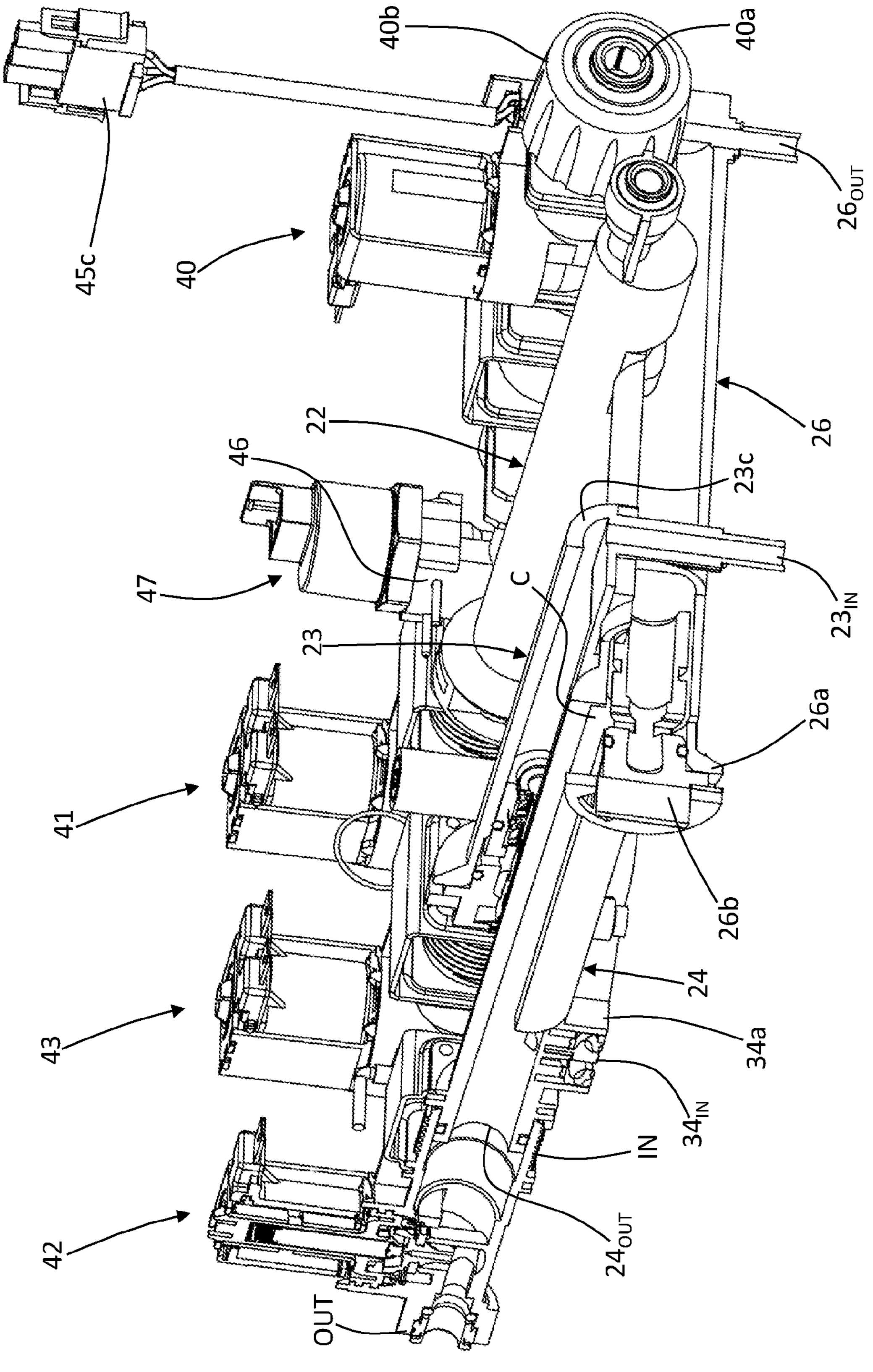
FIG. 18 is a seventh sectional schematic perspective view of a hydraulic unit according to possible embodiments.

At least one of the ducts 23 and 24 also preferably has at least one respective portion with a similar semi-cylindrical section, but extending in a higher position than the transverse duct 26: in the case exemplified, for example, at least the duct 23 has such a portion, indicated by 23*c* for example in FIGS. 14, 16 and 18.

Still in FIGS. 5 and 7, with 47 and 49 are visible the previously mentioned pressure transducer and flow regulator, respectively, of a known conception, designed for assembly at the corresponding seats 46 and 48 defined by the body 20; in the example, the transducer 47 is secured in the corresponding seat 46 by means of an appropriate transverse pin 47*a* (FIG. 7), while the regulator 48 is screwed in a variable way with respect to a female threading defined in the seat 48. Also in this case, however, the specific fixing elements may vary from the case exemplified.

In various embodiments, the body 20 also defines a plurality of inlets and outlets for fluidic connection with the carbonator 3, selected from the following:

- a water outlet, which is configured for connection to the inlet 6*a* of the carbonator,
- a gas outlet, which is configured for connection to the inlet 6*b* of the carbonator,
- a pressurized water outlet, which is configured for connection to the inlet 6*c* of the carbonator,
- a cooled water inlet, which is configured for connection to the outlet 6*d* of the carbonator, and
- a carbonated water inlet, which is configured for connection to the outlet 6*e* of the carbonator.

In various embodiments, these inlets and outlets are defined by the previously mentioned interface, which is provided at the lower side of the body 20, i.e., the side intended to be superimposed on wall 3*a* of the carbonator 3.

The interface is preferably formed in a relatively rigid single piece, but the case is not excluded of a production thereof in a number of relatively rigid parts coupled together to form a respective single body. As mentioned, the body of the hydraulic unit can define in a single piece both a plurality of ducts and the connection interface, but it is also possible to foresee that the ducts, on the one hand, and the interface, on the other hand, are defined by respective single pieces coupled with each other. It is also possible to provide first coupled parts that define the ducts, and second coupled parts that define the interface, with a body formed by the first coupled parts and a body formed by the second coupled parts that are then mutually coupled. It is also possible to provide body parts that define in a single piece both respective ducts, or duct parts, and respective parts of the interface, with these body parts that are then coupled together to form the single body of the hydraulic unit.

In general, the interface is prearranged for enabling a quick and easy connection of the various inlets and outlets of the body of the hydraulic unit with respect to at least corresponding outlets and inlets of the carbonator, preferably through a single operation of mutual coupling.

Preferably, one or more of the water outlet, the gas outlet, the pressurized water outlet, the cooled water inlet and the carbonated water inlet of the connection interface extends substantially angled or perpendicular to a direction of longitudinal extension of one or more from among the first tubular duct, the second tubular duct, the third tubular duct, the fourth tubular duct and the fifth tubular duct.

Figure 8:
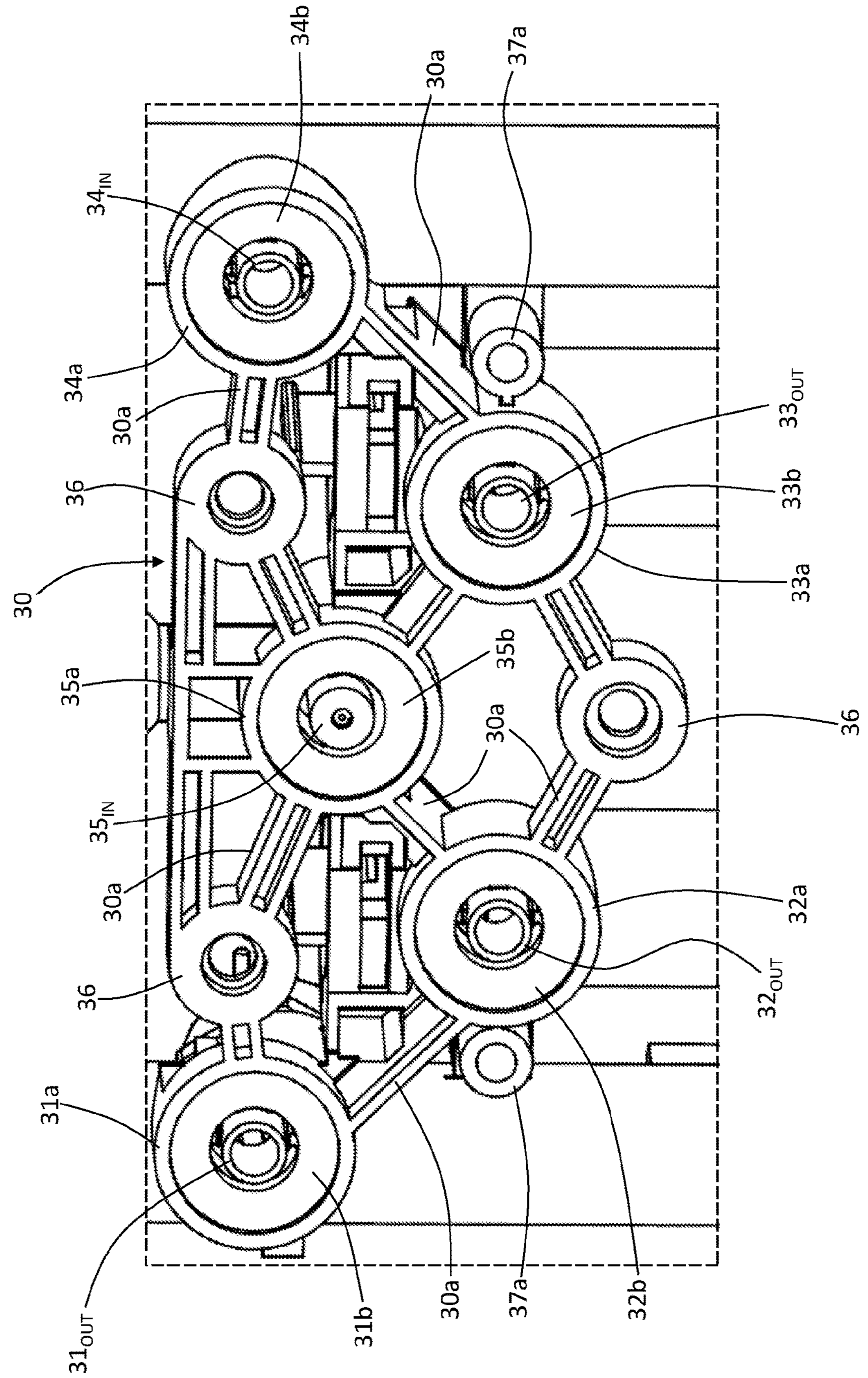
FIG. 8 is a larger-scale detail of FIG. 6.
Figure 10:
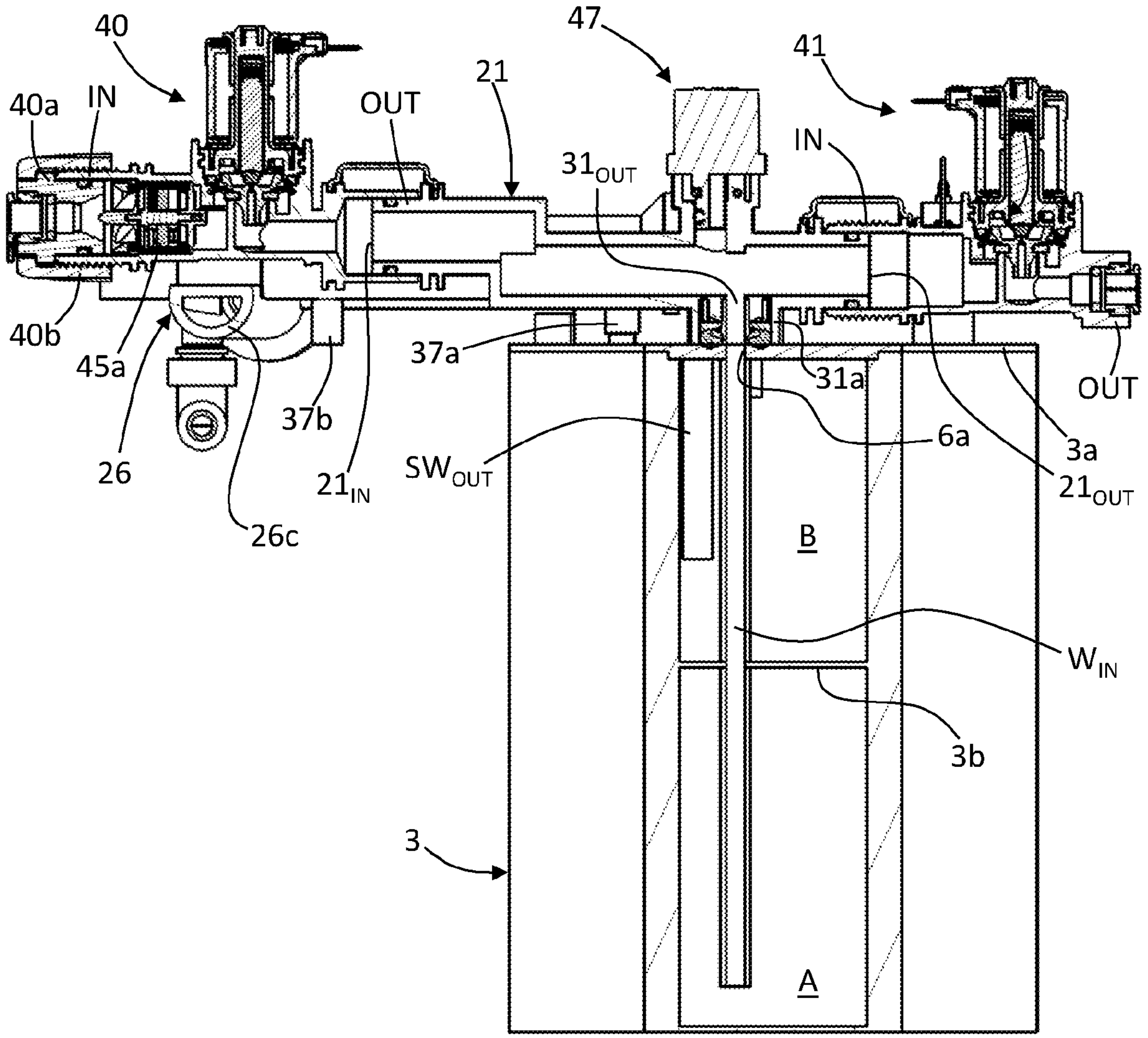
FIG. 10 is a first schematic section of a hydraulic unit according to possible embodiments, associated with a carbonator.
Figure 11:
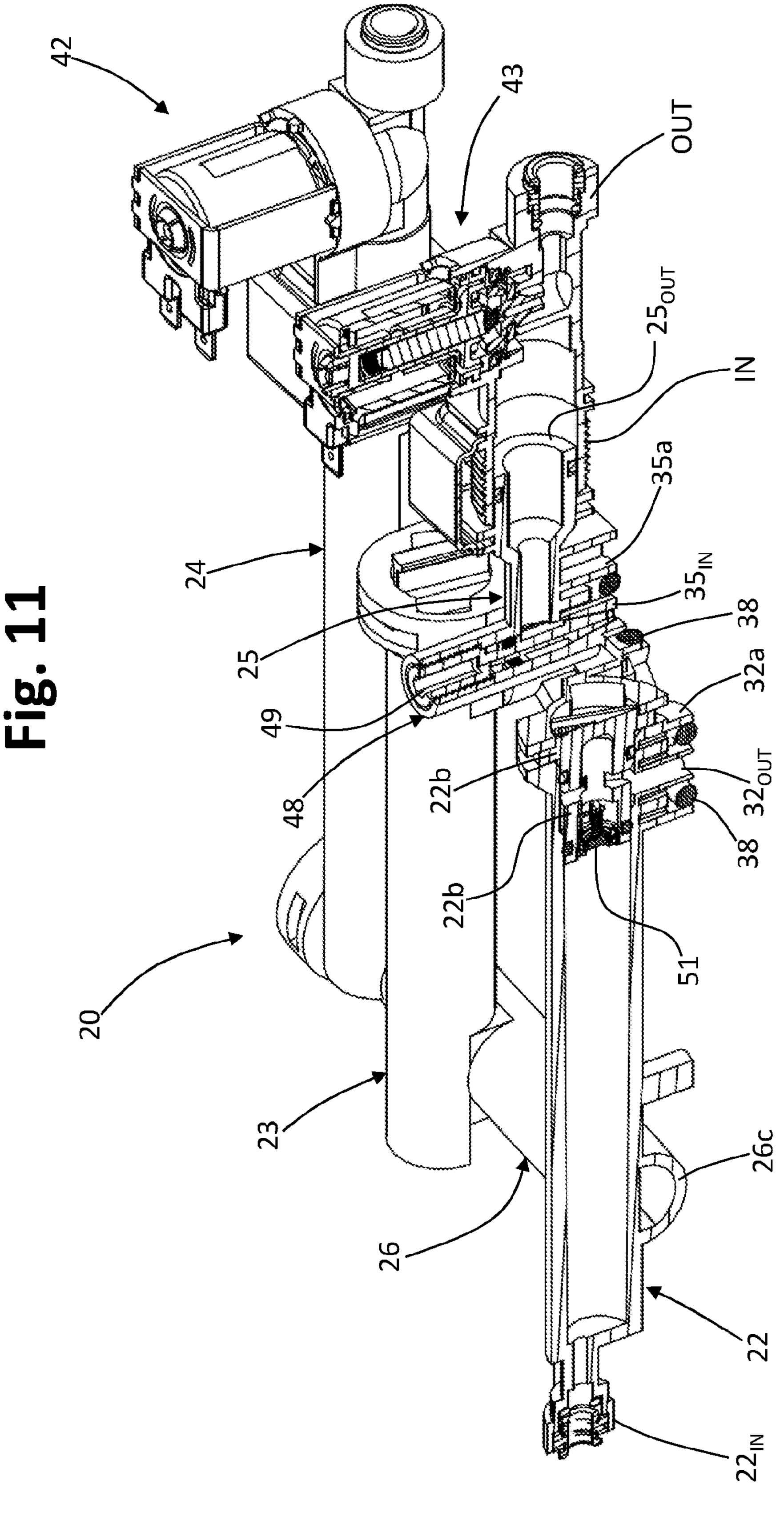
FIG. 11 is a second sectional schematic perspective view of a hydraulic unit according to possible embodiments.
Figure 12:
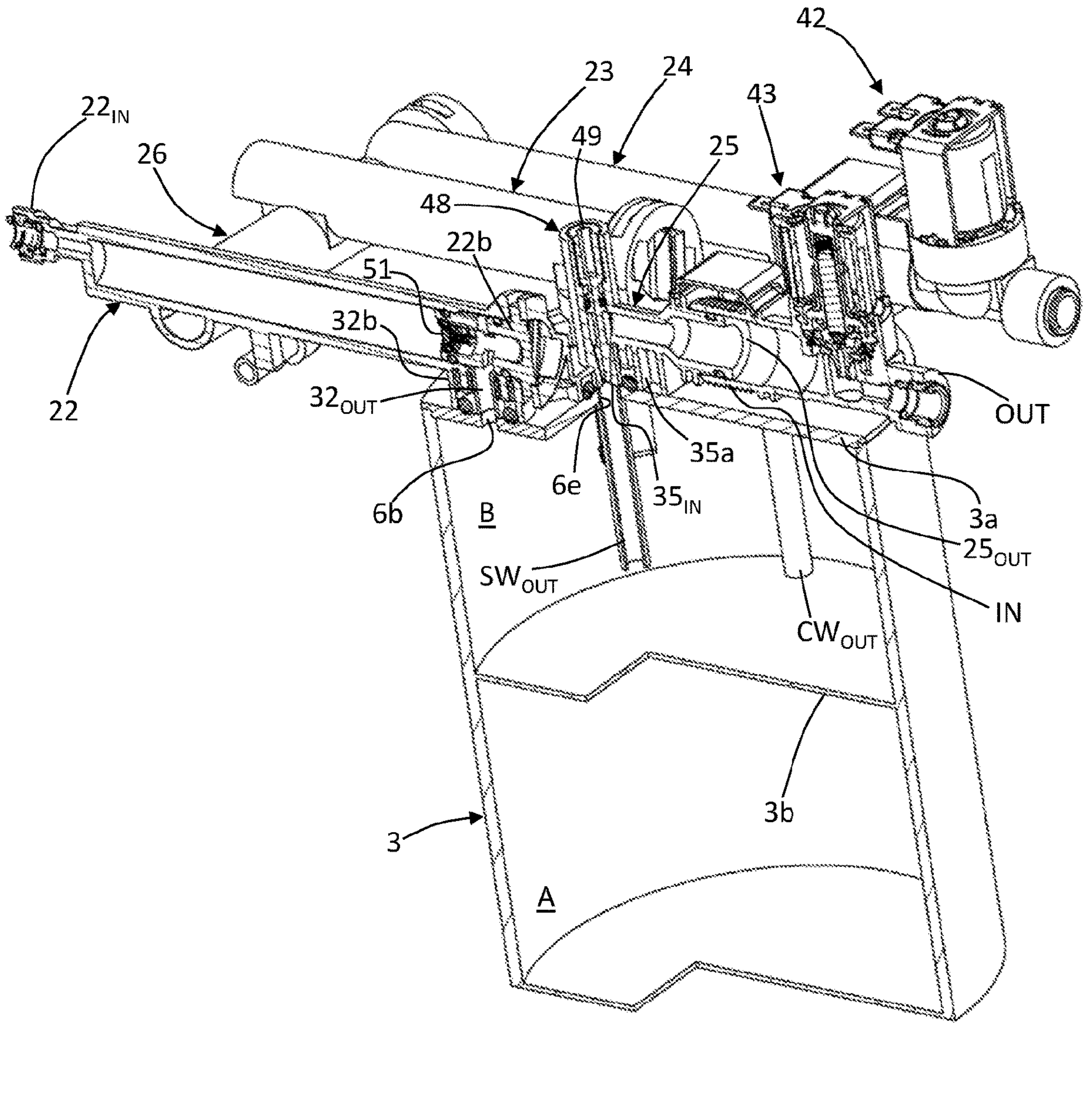
FIG. 12 is a third sectional schematic perspective view of a hydraulic unit according to possible embodiments, associated with a carbonator.
Figure 20:
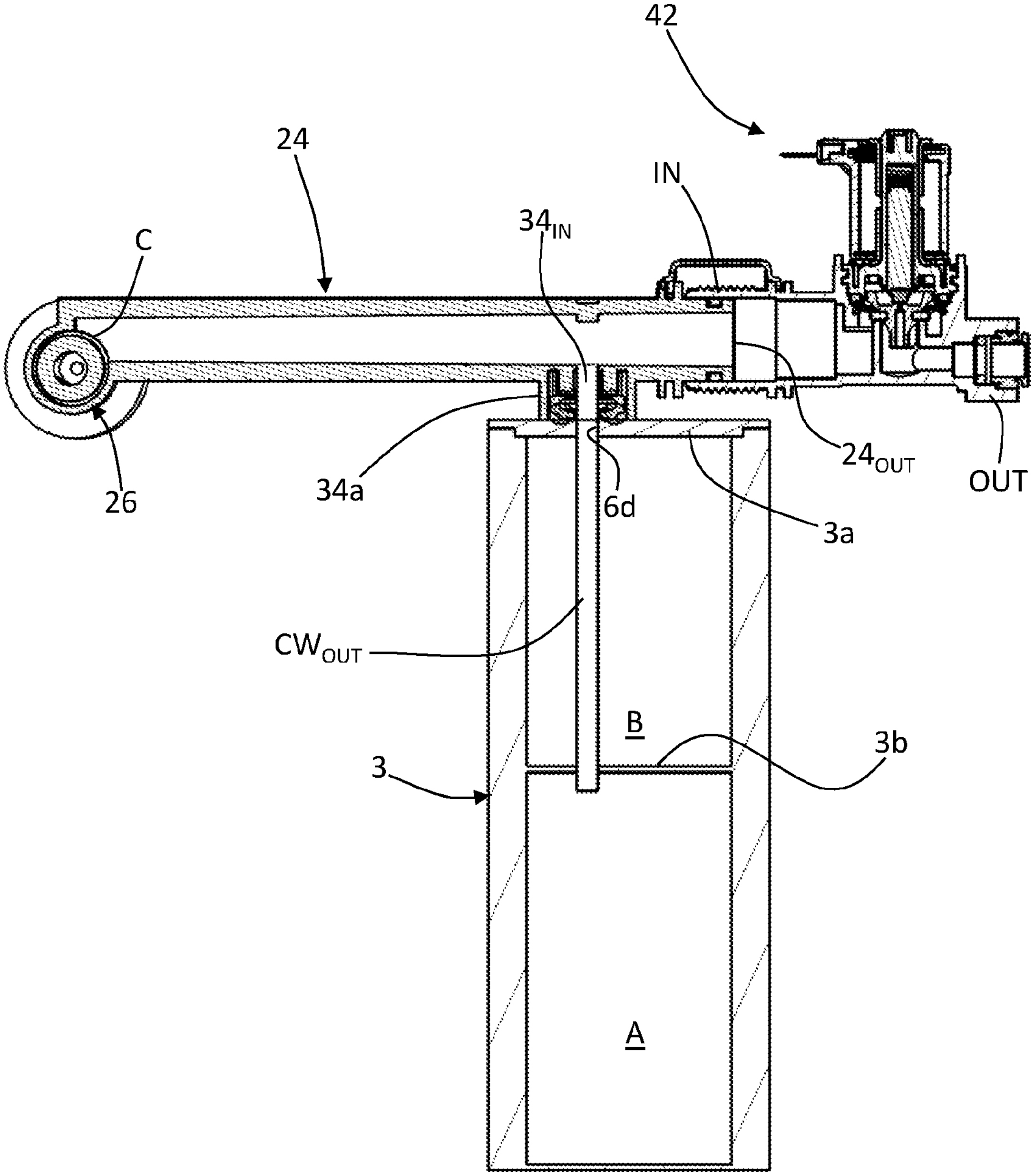
FIG. 20 is a fifth schematic section of a hydraulic unit according to possible embodiments, associated with a carbonator.
Figure 21:
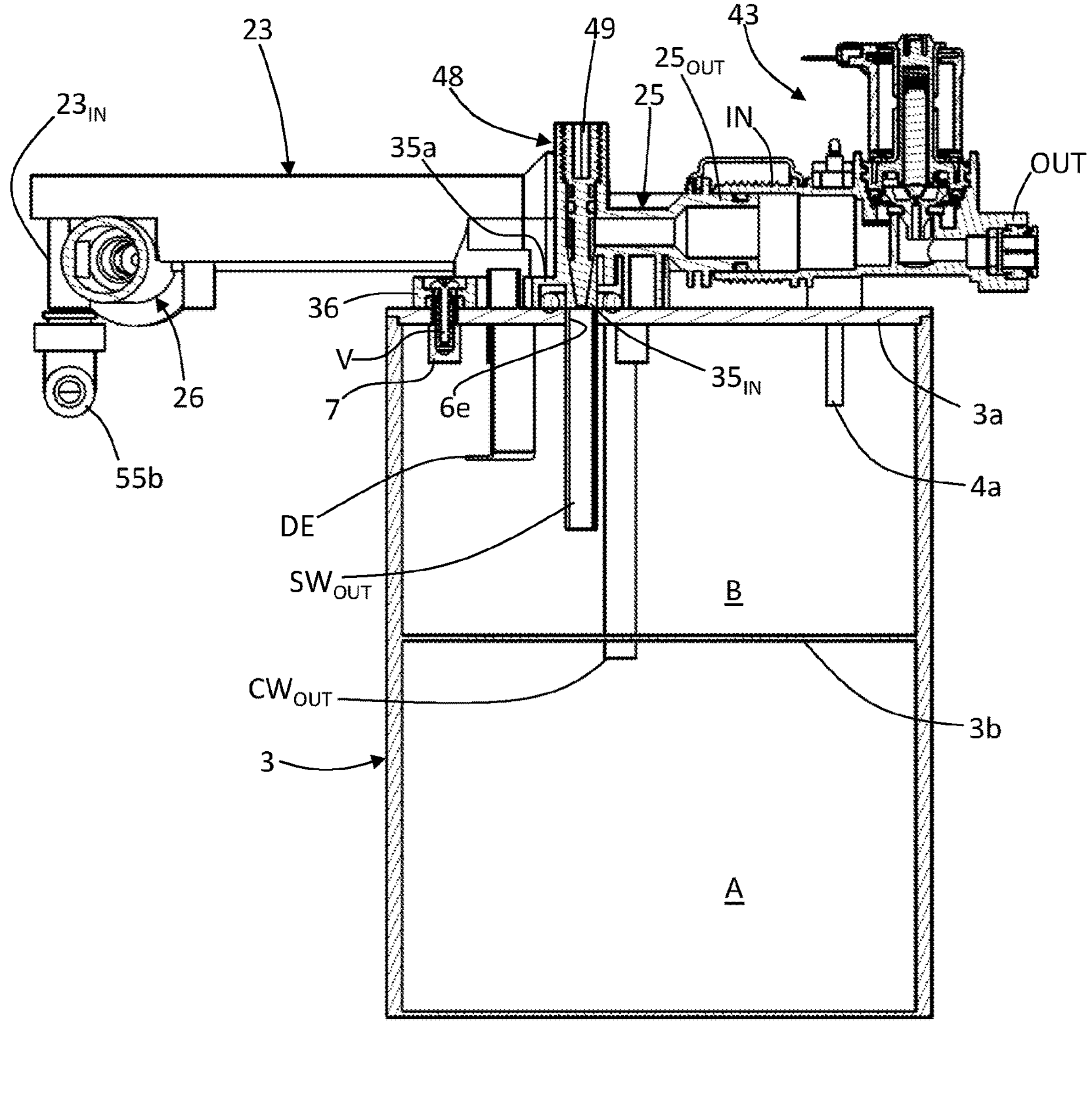
FIG. 21 is a sixth schematic section of a hydraulic unit according to possible embodiments, associated with a carbonator.
Figure 22:
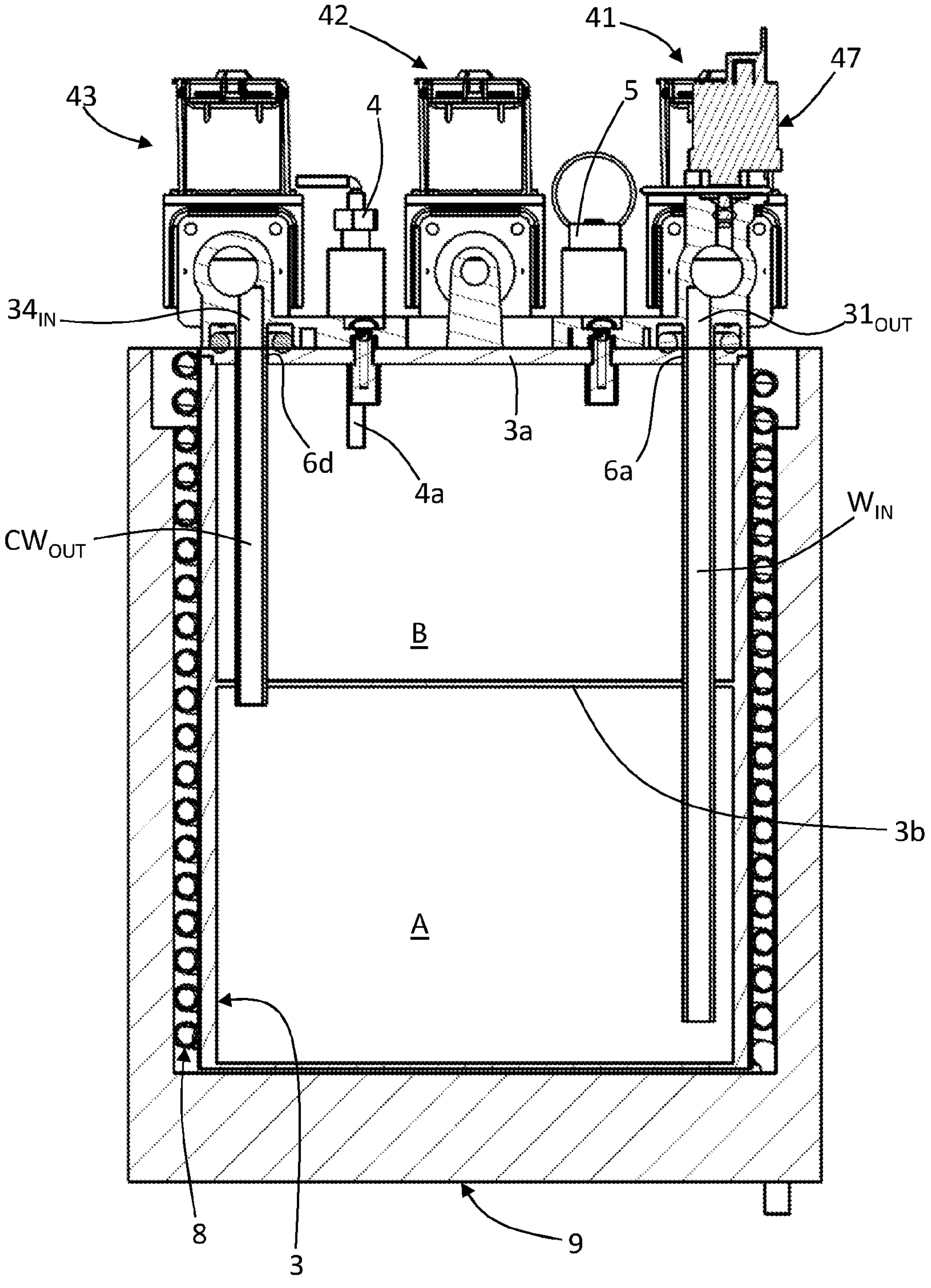
FIG. 22 is a seventh schematic section of a hydraulic unit according to possible embodiments, associated with a carbonator with corresponding refrigerating and insulating elements.

Referring to the non-limiting example of interface 30 as visible in FIG. 6, and to the corresponding detail of FIG. 8:

- the water outlet is indicated with $\mathbf{31}_{OUT}$, and is in fluid communication with the duct 21 (see also FIGS. 9-10 and 22), in an intermediate position between the inlet $\mathbf{21}_{IN}$ and the outlet $\mathbf{21}_{OUT}$;
- the gas outlet is indicated with $\mathbf{32}_{OUT}$, and is in fluid communication with the duct 22 (see also FIGS. 11-13);
- the pressurized water outlet is indicated with $\mathbf{33}_{OUT}$, and is in fluid communication with the duct 23 (see also FIGS. 14-16);
- the cooled water inlet is indicated with $\mathbf{34}_{IN}$, and is in fluid communication with the duct 24, herein in an intermediate position between the outlet $\mathbf{24}_{OUT}$ and the inlet 11*a* of the pump 10, herein via the duct 26 (see also FIGS. 18-20 and 22);
- the carbonated water inlet is indicated with $\mathbf{35}_{IN}$, and is in fluid communication with the duct 25 (see also FIGS. 11, 12, and 21).

In the non-limiting example, the aforementioned outlets $\mathbf{31}_{OUT}$, $\mathbf{32}_{OUT}$, $\mathbf{33}_{OUT}$ and the aforementioned inlets $\mathbf{34}_{IN}$ $\mathbf{35}_{IN}$ extend substantially inclined or perpendicular to the direction of longitudinal extension of the ducts 21-25.

In various embodiments, the connection interface 30 is configured for the assembly of the body 20 at the end or wall 3*a* of the carbonator 3. For this purpose, preferably, the interface 30 includes a plurality of fluidic connections, indicated with 31*a*, 32*a*, 33*a*, 34*a* and 35*a* in FIG. 8, which define the outlets $\mathbf{31}_{OUT}$, $\mathbf{32}_{OUT}$, $\mathbf{33}_{OUT}$ and the inlets $\mathbf{34}_{IN}$ and $\mathbf{35}_{IN}$, respectively. The fluidic connections 31*a*, 32*a*, 33*a*, 34*a*, 35*a* each have an interface side—that is, their side oriented towards the end or wall 3*a* of the carbonator 3—which lie preferably substantially according to one and the same plane.

In various embodiments, the fluidic connections of the connection interface each define a respective seat for a gasket, configured to achieve a seal with respect to the end surface or wall 3*a* of the carbonator 3. Referring in particular to FIG. 8, the fluidic connections 31*a*, 32*a*, 33*a*, 34*a* and 35*a* define annular seats, indicated with 31*b*, 32*b*, 33*b*, 34*b* and 35*b*, respectively, suitable for housing corresponding sealing rings, some of which are indicated with 38 in FIG. 7 (see also FIGS. 11 and 14 for reference). As it can imagined, the rings 38 perform at least an axial sealing function, in particular with respect to the outer surface of the wall 3*a* of the carbonator 3.

In various embodiments, the body 20 defines a plurality of mechanical connections, configured for the mechanical fixing of the unit 1 to the carbonator 3, in particular at the upper end or wall 3*a* thereof. In the example of FIG. 8, the abovementioned mechanical connections are indicated with 36.

The connections 36 are preferably defined in the connection interface 30. In the example of FIG. 8, the connections 36 have essentially eyelet conformation, by means of which the interface 30, and therefore the body 20 of the unit 1, can be fixed at the end 3*a* of the carbonator 3, via the previously mentioned screws V screwed into the threading of elements 7, as shown for example in FIGS. 13, 15 and 21. The mechanical connections 36 also lie preferably according to one and the same plane.

In various embodiments, body 20 defines a plurality of support elements, configured for local rest without mechanical constraints on one or more components of the cooler-carbonator 3.

Figure 9:
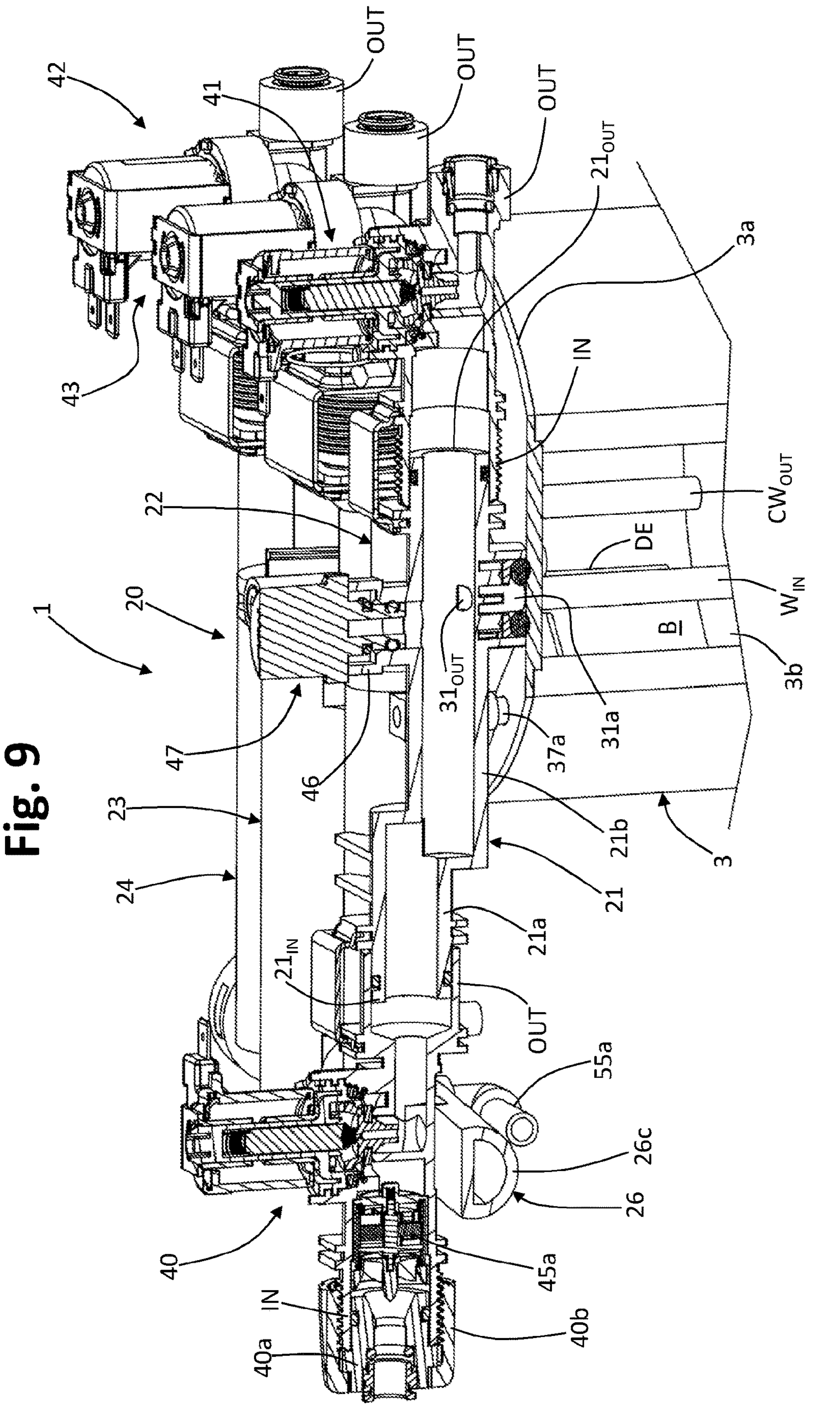
FIG. 9 is a first schematic, partial and sectioned, perspective view of a hydraulic unit according to possible embodiments, associated with a carbonator.

In the example shown in FIG. 8, with 37*a* first support elements are indicated, defined substantially within the interface 30, in positions shifted or offset with respect to the fluidic connections, and designed for resting on the end 3*a* of the carbonator 3 (see for example FIGS. 9-10).

Figure 15:
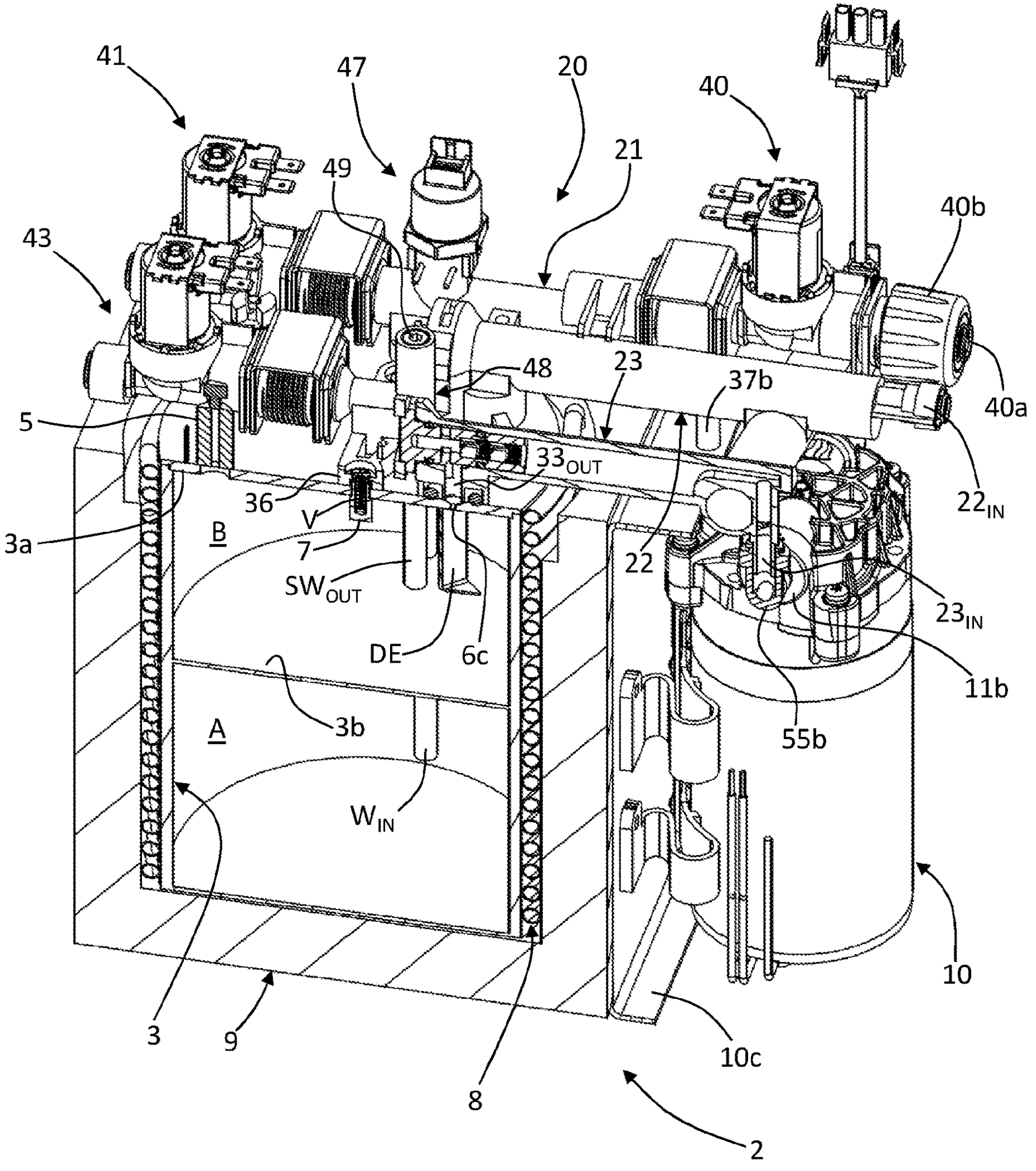
FIG. 15 is a sixth sectional schematic perspective view of a hydraulic unit according to possible embodiments, associated with a pump and a carbonator with corresponding refrigerating and insulating elements.

With reference to FIG. 6, with 37*b* second support elements are indicated, spaced apart from the interface 30, configured for local rest on a stationary structure of the cooler-carbonator 3, such structure being here represented by the upper end of the fixing plate 10*c* of the pump 10 (see for example FIG. 15). Preferably, the first and/or second support elements 37*a*, 37*b* have respective resting ends that lie substantially according to one and the same plane; very preferably, the resting ends of the elements 37*a* and 37*b* all lie substantially according to one and the same plane.

Still from FIG. 8 it is possible to see how, in various preferential embodiments, at least the fluidic connections 31*a*, 32*a*, 33*a*, 34*a*, 35*a* are interconnected with each other, and preferably also interconnected with the mechanical connections 36 of the interface 30. In the example, the interconnection is obtained by means of portions or walls 30*a* of the body 20, such as substantially straight portions, to form a substantially lattice structure. This conformation allows to contain the total weight of the body 20 and the amount of material necessary for manufacturing thereof, while ensuring an adequate structural strength. Possibly, the resting elements can also be interconnected to the fluidic connections and/or mechanical connection through similar straight portions of the body 20.

In FIGS. 9 and 10 it is clearly visible how, preferably, the outlet $\mathbf{31}_{OUT}$ of the fluidic connection 31*a* is defined in an intermediate position of the duct 21, for the connection with the corresponding inlet 6*a* of the carbonator 3, having associated thereto a duct WIN for supplying water to the carbonator 3.

In the non-limiting example represented in the figures, the internal volume of the carbonator 3 is divided into two sections or compartments by an intermediate transverse wall, indicated in the figures with 3*b*. The lower compartment, indicated with A, is basically intended for the production and accumulation of cooled water, while the upper compartment, indicated with B, is intended to ensure presence within it of an atmosphere of gas under a slight pressure, that is, carbon dioxide in the example considered here. The abovementioned duct WIN, which passes through the intermediate wall 3*b* and extends until close to the bottom of compartment A (see also FIG. 22), is therefore intended to adduce to the compartment A water coming from the inlet $\mathbf{21}_{IN}$, for the purposes of cooling this water.

Figure 13:
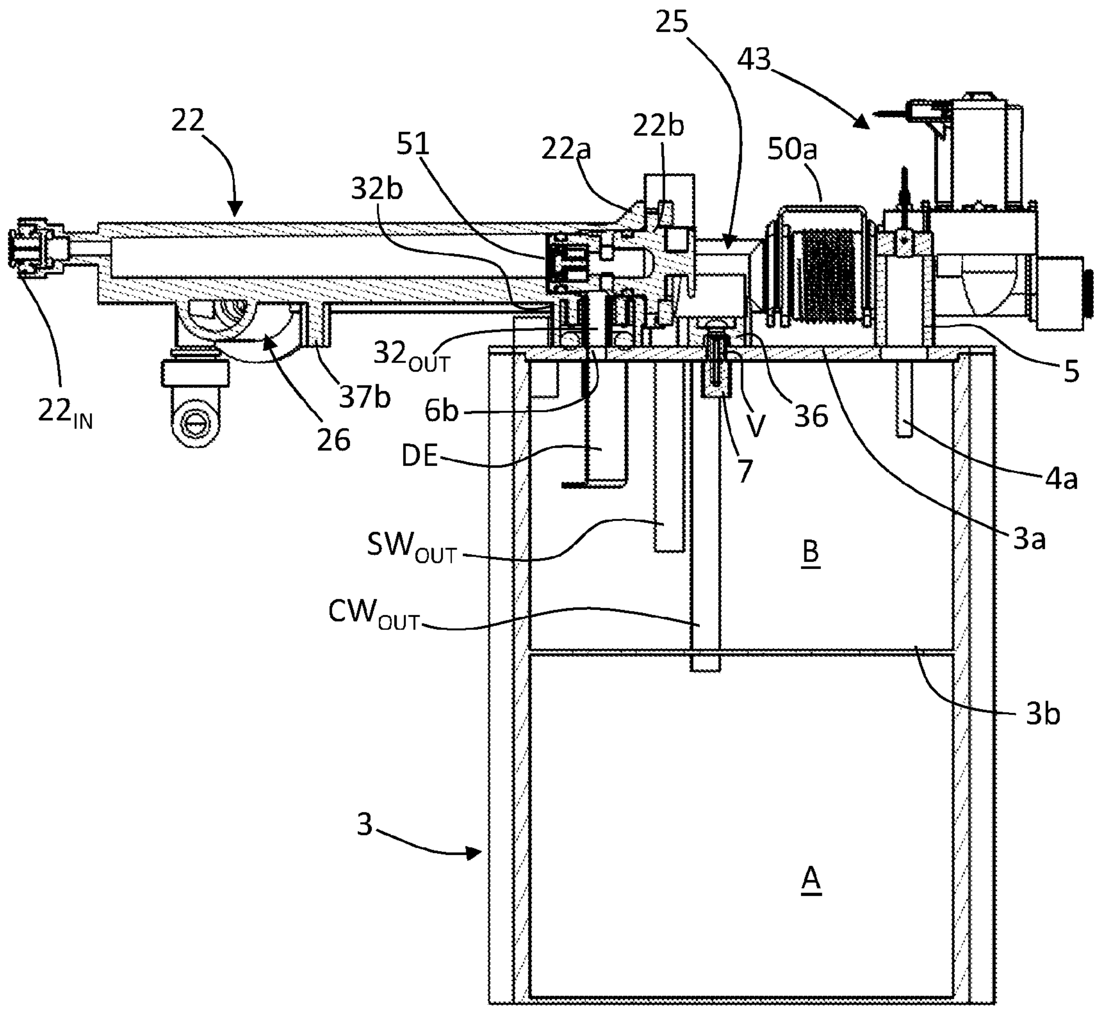
FIG. 13 is a second schematic section of a hydraulic unit according to possible embodiments, associated with a carbonator.

In FIGS. 11-13 it is visible how the outlet $\mathbf{32}_{OUT}$ of the fluidic connection 32*a* of the connection interface is connected to the inlet 6*b* of the carbonator 3, this inlet 6*b* opening in the upper compartment B. From these figures it may also be noted that the non-return valve 51, here associated, or close, to the cap 22*b*, is located within the duct 22 in an intermediate position between its inlet $\mathbf{22}_{IN}$ and outlet $\mathbf{32}_{OUT}$. In this way, as can be imagined, within carbon dioxide can be retained at a certain pressure within the compartment B.

Figure 17:
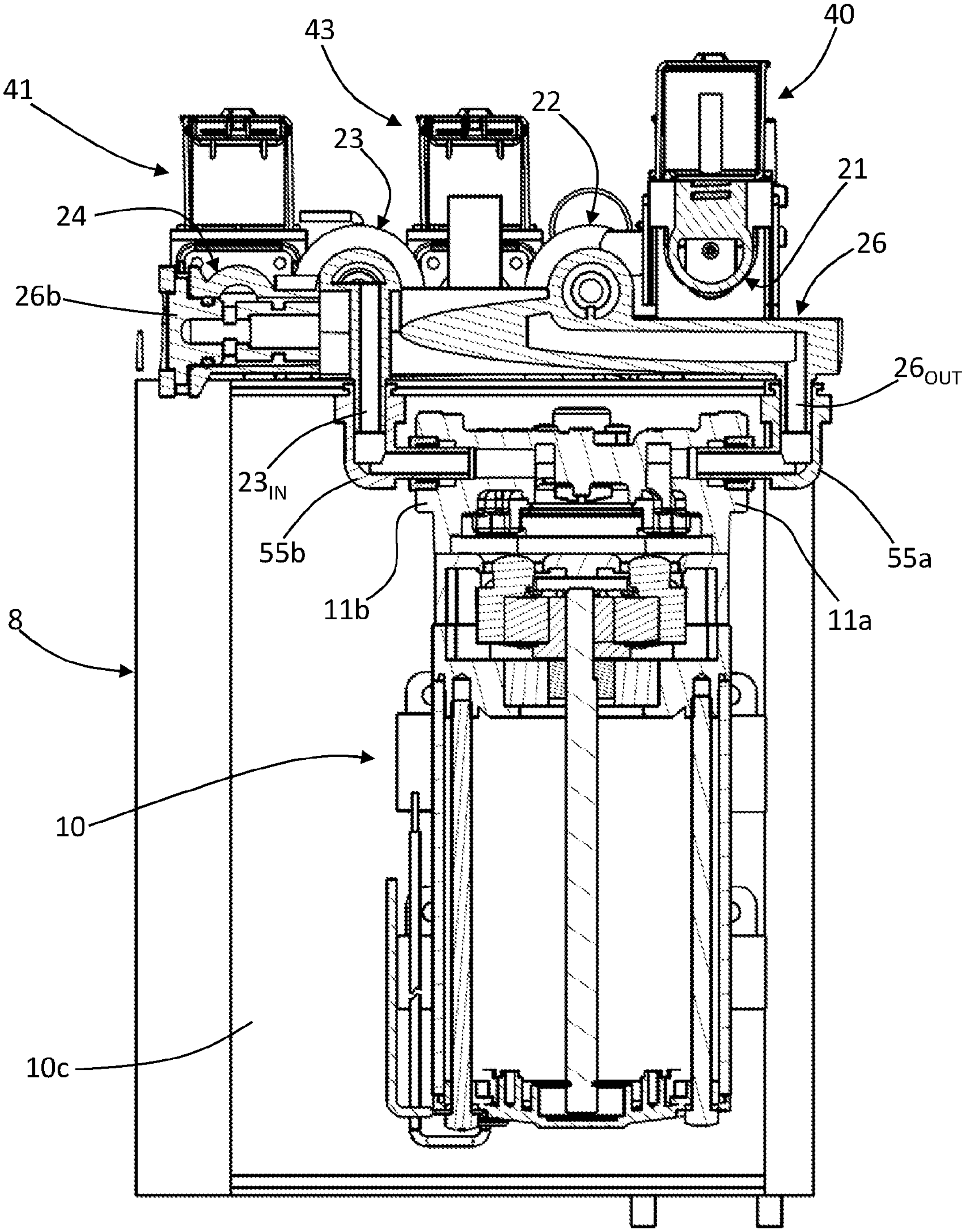
FIG. 17 is a fourth schematic section of a hydraulic unit according to possible embodiments, associated with a pump and a carbonator with corresponding refrigerating and insulating elements.

In FIGS. 14-16 there are visible the outlet $\mathbf{33}_{OUT}$ of the fluidic connection 33*a* of the connection interface, designed for connection with the inlet 6*c* of the carbonator 3, as well as—also in FIG. 17—the inlet $\mathbf{23}_{IN}$ of the duct 23, designed for connection with the outlet 11*b* of the pump 10 (see in particular FIGS. 15 and 17), through the corresponding fitting 55*b*. The inlet 6*c* also opens in the compartment B of the carbonator 3, and essentially consists of a calibrated hole (with a diameter approximately between 0.8 and 1.2 mm), for the forced entry of water into the carbonator. In particular, from FIGS. 15 and 16 it is possible to notice how, in front of the entrance 6*c*, at a certain distance therefrom inside the compartment B, there is preferably positioned a portion of a deflector element DE, here substantially L-shaped, in such a way that pressurized water entering through the inlet 6*c* hits this portion of the deflector DE, for the reasons explained hereinafter.

From FIGS. 14-16 it is well noted how the non-return valves 52 and 53, here associated, or close, to the plug 23*b*, are located within the duct 22 in an intermediate position between the inlet $\mathbf{23}_{IN}$ and outlet $\mathbf{33}_{OUT}$ thereof. In this way, as it can be imagined, valves 52 and 53 also prevent the outflow from compartment B of the carbon dioxide contained thereinto.

Figure 19:
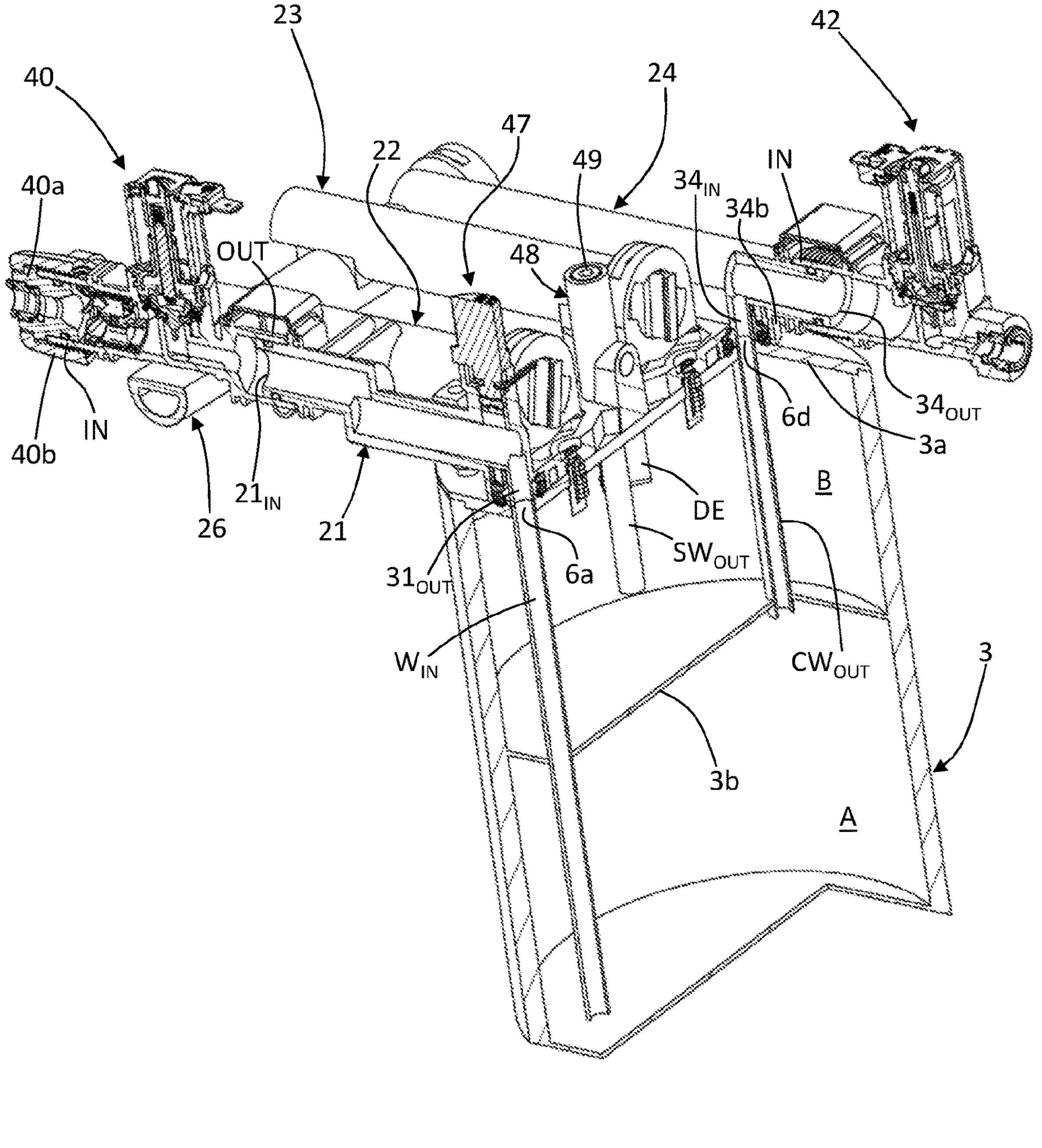
FIG. 19 is an eighth sectional schematic perspective view of a hydraulic unit according to possible embodiments, associated with a carbonator.

In FIGS. 18-20 it is visible the inlet $\mathbf{34}_{IN}$ of the fluidic connection 34*a* of the connection interface, designed for connection with the inlet 6*d* of the carbonator 3, to which a duct $CW_{OUT}$ is associated, for withdrawing cooled water from the carbonator 3, in particular from compartment A. For this purpose, the aforementioned duct $CW_{OUT}$ passes through the intermediate wall 3*b* and extends slightly beyond it, at the upper part of compartment A (see also FIG. 22). In FIG. 18 is also visible the duct 26, with its outlet $\mathbf{26}_{OUT}$, designed for connection with the inlet 11*a* of the pump 10 (see also FIG. 17), through the corresponding fitting 55*a*.

From FIG. 18 it is clear how, in the shown example of implementation, the duct 24 and the duct 26 are connected to each other, in the area indicated by C, and how the inlet $\mathbf{34}_{IN}$ is located along the duct 24 in a position intermediate to the delivery outlet $\mathbf{24}_{OUT}$ and this connection area C between the ducts 24 and 26.

Still in FIGS. 11-12 and FIG. 21 there is visible the inlet $\mathbf{35}_{IN}$ of the fluidic connection 35*a* of the connection interface, designed for connection with the outlet 6*e* of the carbonator 3, to which a duct is associated, for the withdrawal of carbonated water $SW_{OUT}$ from the carbonator 3, particularly from compartment B. For this purpose, the aforementioned duct $SW_{OUT}$ extends within the compartment B at a lower height than the portion of the deflector element DE that is opposite to the inlet 6C (see also FIG. 15).

From FIGS. 11, 12 and 21 it can be seen how the inlet $\mathbf{35}_{IN}$ is defined substantially in a position corresponding to the end of the duct 25 which is opposite to the outlet $\mathbf{25}_{OUT}$, and how the flow regulator 49, i.e., its regulating tip, is located right at the inlet $\mathbf{35}_{IN}$, in order to allow prior adjustment of its passage section (screwing more or less the regulator 49 in the corresponding threaded seat 48).

The valve assemblies 40-43 are of a normally-closed type and are opened depending on the water withdrawals made by a user of the cooler-carbonator, by operating on respective control elements, for example keys present on a user interface (not represented) of the cooler-carbonator.

When the user wants the supply of water at room temperature, he operates a first key, thereby determining opening of the valve assembly 41 associated with the outlet $\mathbf{21}_{OUT}$ of the duct 21: in this way a decrease in pressure inside the duct 21 takes place, detected by means of the pressure transducer 47, which consequently controls opening of the valve assembly 40 associated with the inlet $\mathbf{21}_{IN}$ of the same duct 21: in this way, passage of water from the inlet IN of the valve assembly 40 to the outlet OUT of the valve assembly 41 is allowed.

When the user wants the dispensing of cooled water, he operates a second key, thereby determining opening of the valve assembly 40 associated with the inlet $\mathbf{21}_{IN}$ of duct 21 and the opening of the valve assembly 42 associated with the outlet $\mathbf{24}_{OUT}$ of duct 24. In this way, referring for example to FIG. 19, mains water at room temperature can flow into the compartment A of the carbonator, through the duct 21, the outlet $\mathbf{31}_{OUT}$ and the duct WIN associated with the inlet 6*a* of the carbonator, and a corresponding volume of chilled water is forced to flow out of this compartment A, through the duct $CW_{OUT}$ associated with the outlet 6*d* of the carbonator 3 and the inlet $\mathbf{34}_{IN}$: the cooled water is then dispensed through the outlet OUT of the valve assembly 42.

When the user wants the dispensing of carbonated water, he operates a third key, thereby determining opening of the valve assembly 43 associated to the outlet $\mathbf{25}_{OUT}$ of the duct 25, and activation of the pump 10. Pump 10 (see for example FIGS. 12, and 17-19) sucks at the inlet 11*th* thereof cooled water from compartment A of the carbonator 3, via the duct $CW_{OUT}$, the inlet $\mathbf{34}_{IN}$, the ducts 24 and 26, and the outlet $\mathbf{26}_{OUT}$. This chilled water is then forced at the outlet 11*b* of the pump 10, to reach the outlet $\mathbf{33}_{OUT}$ and hence penetrate the compartment B of the carbonator 3, through the inlet 6*c* (see for example FIG. 15), after passing the non-return valves 52-53. Therefore, the water forced by the pump is under pressure (for example between 8 and 10 bar, greater than that of the carbon dioxide atmosphere present in compartment B), and penetrates with high energy the calibrated inlet 6*c* of the carbonator 3, substantially nebulizing and hitting with force the corresponding opposite portion of the deflector element DE: in this way, the nebulized water particles aggregate to the carbon dioxide present in the compartment B, and then flow through the duct $SW_{OUT}$ associated with the outlet 6*e* of the carbonator, i.e., at the inlet $\mathbf{35}_{IN}$ of the hydraulic unit 1, through the flow regulator 49; the carbonated water can then flow into duct 25 to be dispensed through the outlet OUT of the valve assembly 43.

The level probe 4 of the carbonator 3 has a detection part 4*a* (see for example FIGS. 13 and 16), in order to prevent the compartment B from being complete filled with water, that is, to keep the upper part free for the carbon dioxide. The safety valve 5 of the carbonator 3 (see e.g., FIG. 15) prevents potentially dangerous pressures from being established inside the carbonator 3.

In the embodiments previously exemplified, the hydraulic unit according to the invention is equipped with a plurality of electrically controllable valve assemblies. However, this is not an essential feature, since in possible variants embodiments, the hydraulic unit could be designed for use on cooler-carbonators provided, for example, with taps that are manually operable by the user. In this perspective, one or more ducts of the body 20 could have a modified shape, also at their inlets and/or outlets.

Figure 23:
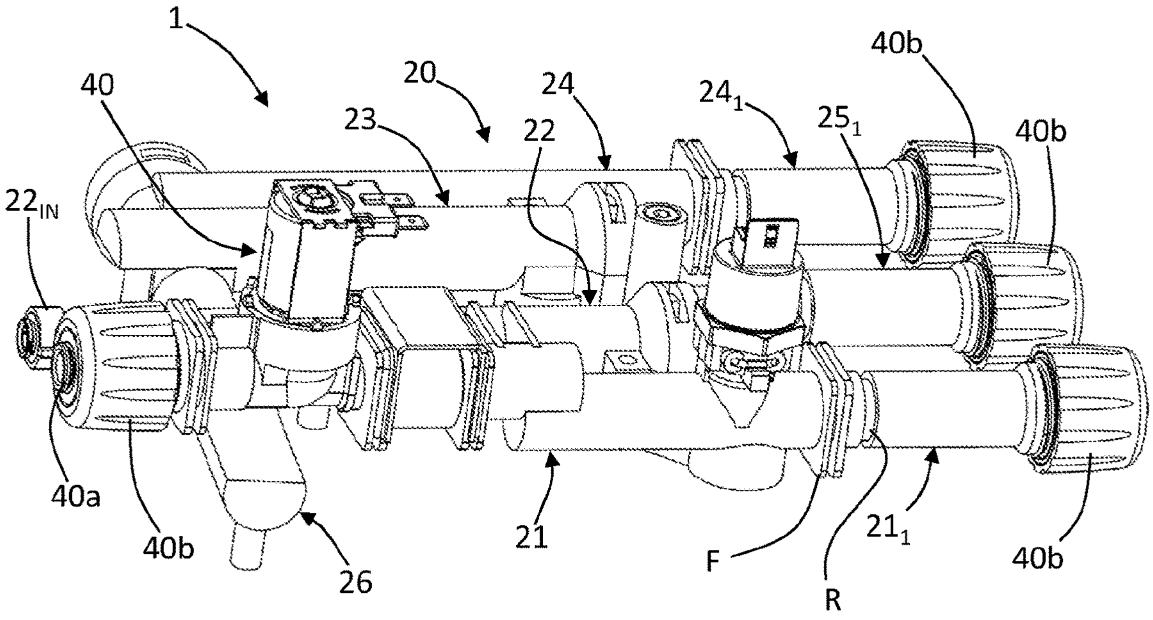
FIGS. 23, 24 and 25 are schematic perspectives views of hydraulic units according to possible variant embodiments.
Figure 24:
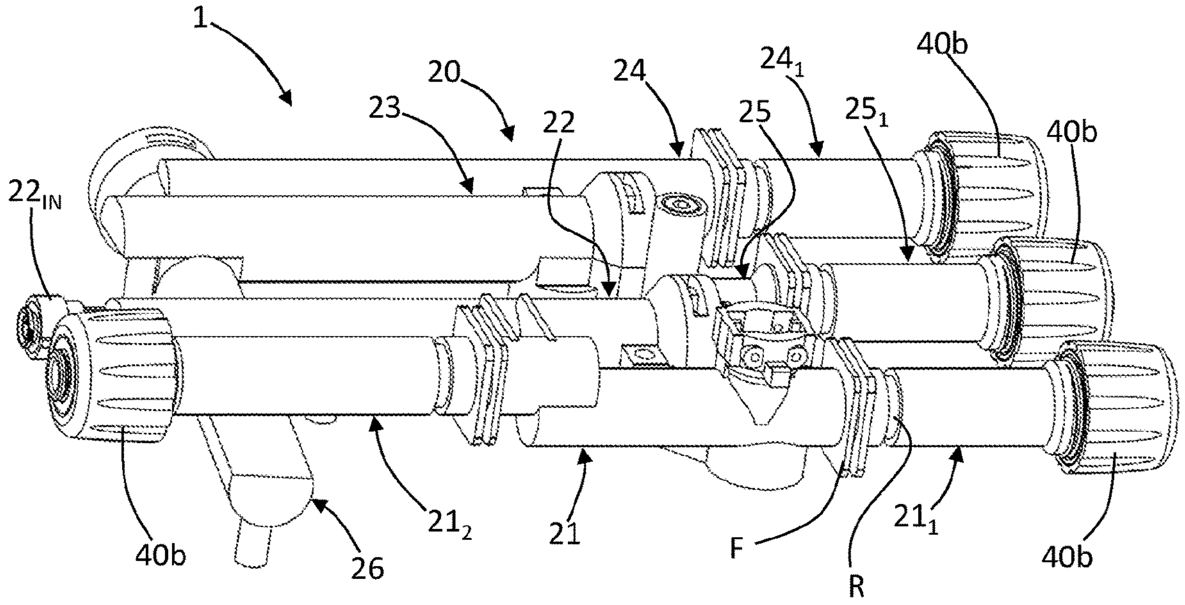

For example, FIG. 23 illustrates the case of a unit 1 in which the ducts 21, 24 and 25 of the body 20 have a modified shape, where in particular each of them has a respective terminal portion 211, 241 and 251, without valve assemblies directly associated thereto, which defines a relative attachment, preferably of a quick type, not visible, but for example similar to the quick coupling of the inlet $\mathbf{22}_{IN}$ with its ring nut 40*b*, or equipped with a module of the type previously indicated with 40*a* (see FIG. 7). In such a case, therefore, the outlets $\mathbf{21}_{OUT}$, $\mathbf{24}_{OUT}$ and $\mathbf{25}_{OUT}$ of the body 20 are obtained by such quick couplings. FIG. 24 illustrates the case of a body 20 whose duct 21 has a respective initial portion 212 without a directly associated valve assembly, which defines such an attachment, preferably of the quick type; in such a case, therefore, the inlet $\mathbf{21}_{IN}$ of body 20 is obtained by such an attachment.

Note that, in FIGS. 23 and 24, the ducts 21, 24 and 25 are provided with flange elements F of the type previously indicated with 50, near which the ducts themselves define grooves or restrictions R (the aforementioned flange elements F and the aforementioned restrictions R are indicated in FIGS. 23-24 only for duct 21). This configuration can be useful to obtain a single version of the body 20 by moulding, which can be used as shown in FIGS. 23-24, or which can instead be modified by mechanically removing the portions of the duct downstream of the aforementioned restrictions R, in order to obtain useful space for the coupling of valve assemblies of the type previously indicated with 41, 42 and 43; in this case the restrictions R realize the hydraulic connections for the valve groups and the seats for the corresponding sealing rings, while the elements F are used for the mechanical fixing of such valve assemblies, for example using brackets of the type previously indicated with 50*a*.

Figure 25:
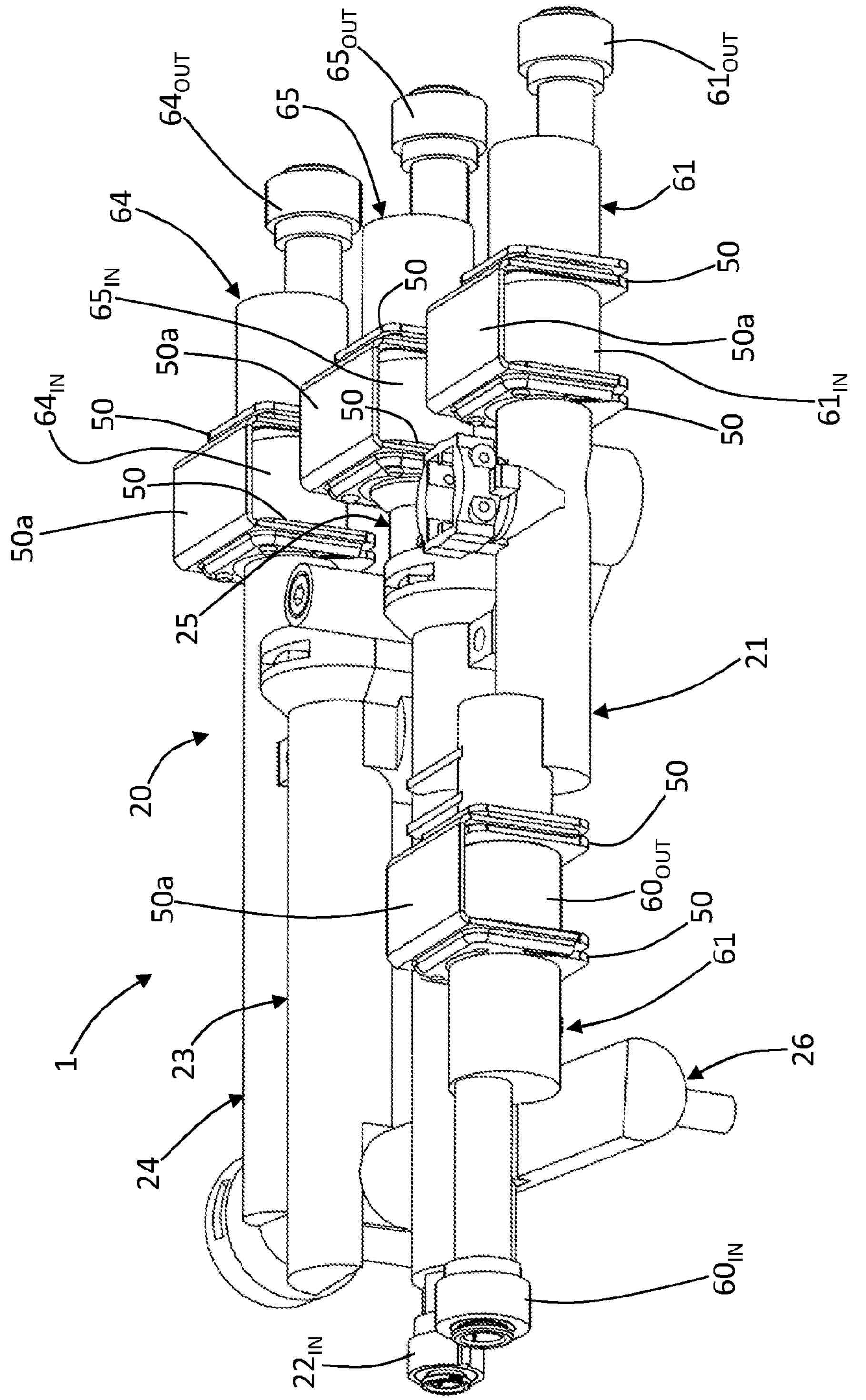
Figure 26:
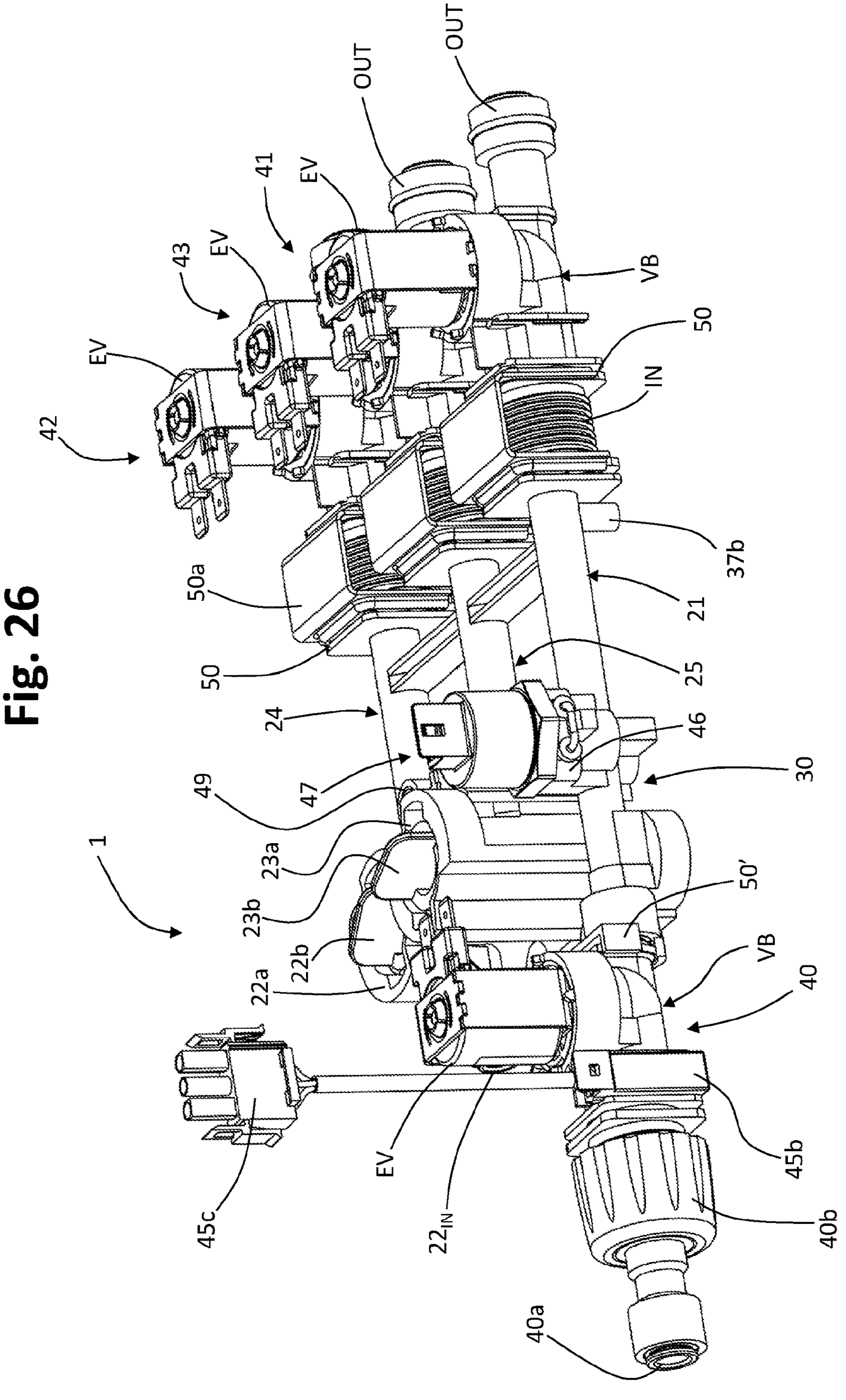
FIGS. 26 and 27 are schematic perspective views, from different angles, of a hydraulic unit according to further possible embodiments.
Figure 27:
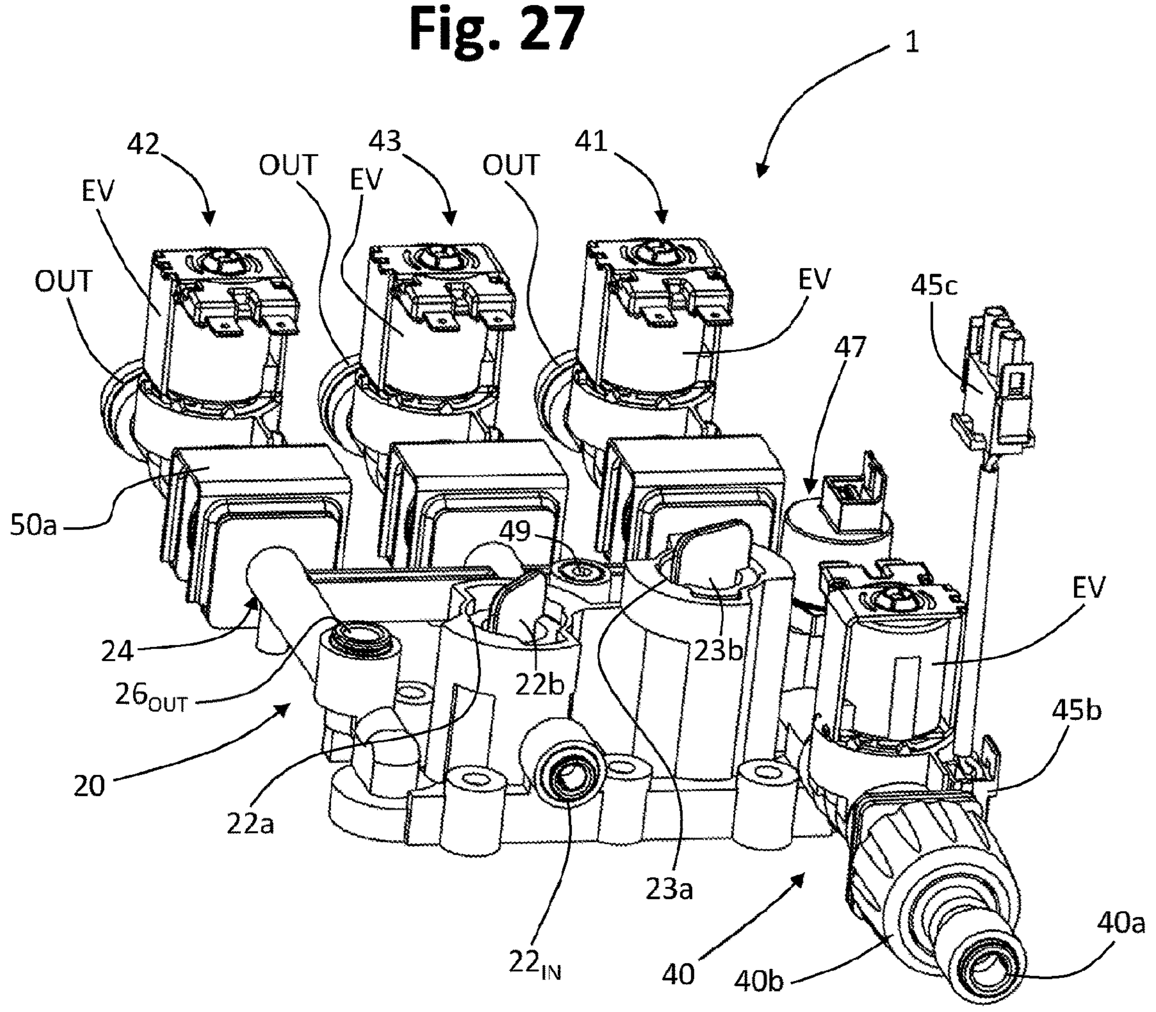
Figure 28:
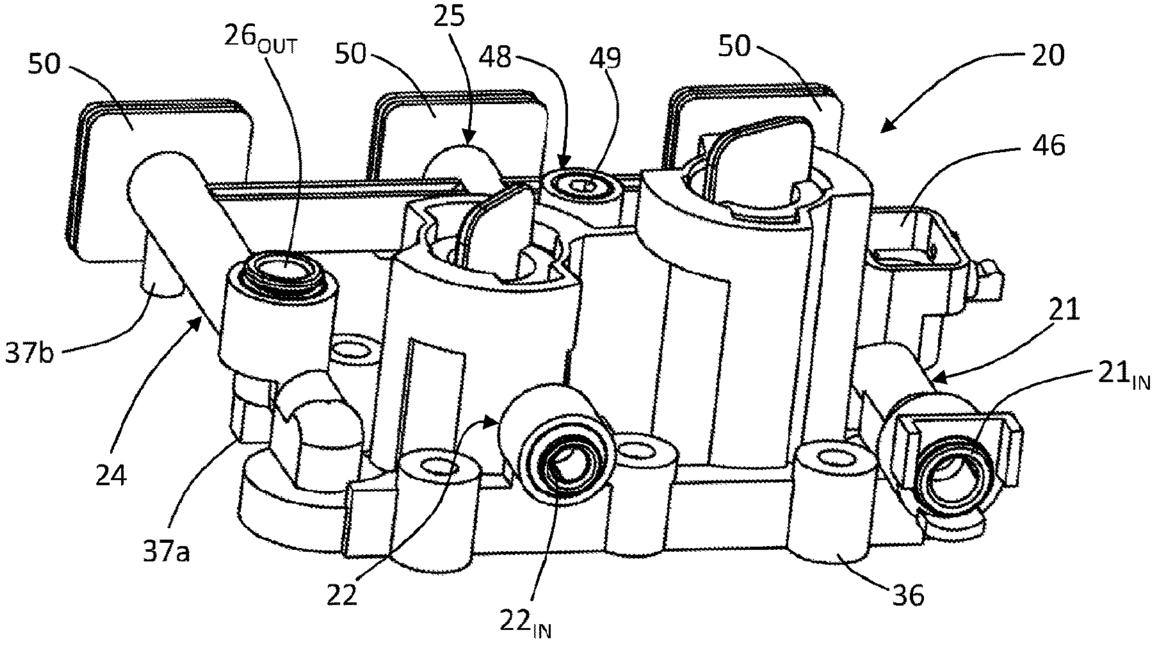
FIG. 28 is a schematic perspective view of a body of the unit of FIGS. 26-27, with some functional components associated thereto.

A body 20 substantially of the type described with reference to FIGS. 4-6 can also have associated thereto one or more extension elements, to obtain configurations without one or more valve assemblies as exemplified in FIGS. 23 and 24. For example, FIG. 25 shows a case similar to that of FIG. 24, in which a body 20 have associated thereto extension elements indicated with 61, each having a tubular body of plastic material which defines the respective inlet and outlet.

In the example, an extension element 61 has an inlet $\mathbf{61}_{IN}$, for example configured with a quick coupling, and an outlet $\mathbf{61}_{OUT}$ that is shaped for sealed coupling with the inlet $\mathbf{21}_{IN}$ (not visible here) of the duct 21. Similarly, three further extension elements 61 have respective inlets $\mathbf{61}_{IN}$ shaped for sealed coupling with the outlets $\mathbf{21}_{OUT}$, $\mathbf{24}_{OUT}$ and $\mathbf{25}_{OUT}$ of the ducts 21, 24 and 24 (not visible here), and respective outlets $\mathbf{61}_{OUT}$, for example configured with a quick coupling. In the example, the extension elements 61 integrally define—near the respective inlets or outlets for fluidic connection with the body 20—mechanical fixing elements of the type already indicated with 50, in order to enable the parts 20 and 61 to be secured to each other by means of fixing members of the type previously indicated with 50*a*.

In FIGS. 26-31 there is represented in a schematic form a hydraulic unit 1 in accordance with further possible embodiments. In these figures the same reference numbers as the previous figures are used, to indicate elements technically equivalent to those already described above. Also this hydraulic unit 1 has a respective body 20 made of plastic material, configured for mounting on a carbonator, in particular at its end or upper wall equipped with inlets and outlets.

With respect to the embodiments mentioned above, unit 1 of FIGS. 26-31 is distinguished by a more compact body 20, and configured for connection to the pump of a carbonator apparatus by means of pipes, preferably at least partly flexible pipes. Note that what has been described above in relation to these carbonator apparatus and pump is equally valid in the case of the unit 1 of FIGS. 26-31. Unit 1 of FIGS. 26-31 includes the various components and ducts already described above, which are simply redistributed, while ensuring the same functionalities already indicated for the unit 1 of FIGS. 1-25, in particular in terms of fluidic connection to the carbonator and the pump.

Unit 1 of FIGS. 26-31 is particularly prearranged for connection to a pump by means of pipes, preferably flexible pipes. For this reason, as compared to the versions of hydraulic unit 1 referred to in FIGS. 1-25, unit 1 of FIGS. 26-31 does not require the duct 26 in which the suction output $\mathbf{26}_{OUT}$ is to be defined, and the ducts 22 and 23 can have a respective comparatively smaller axial development, also compared to the ducts 21, 24 and 25, as can be seen for example in FIGS. 29-30; on the other hand, the duct 25 may have a longer development than in the case of unit 1 of FIGS. 1-25.

Figure 29:
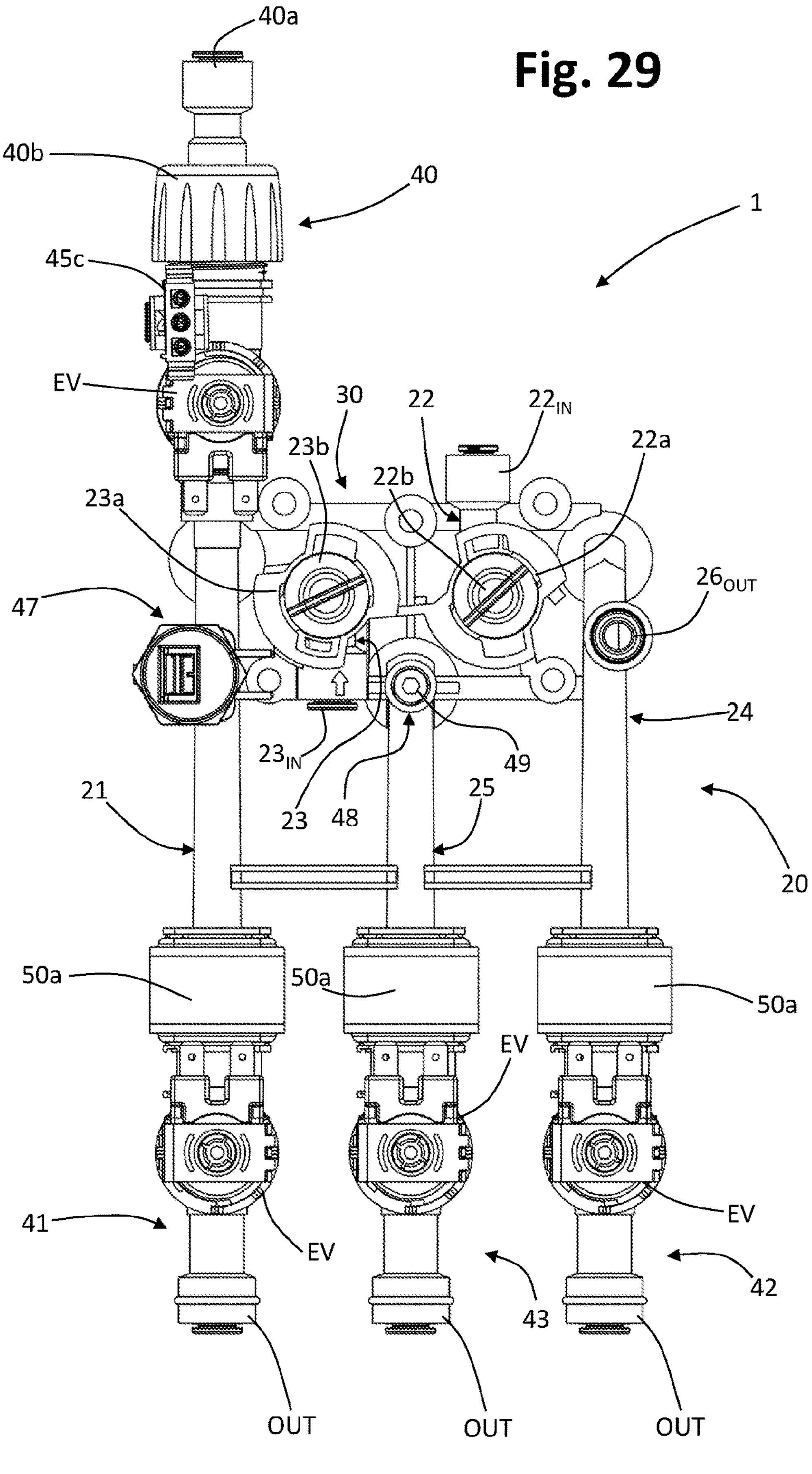
FIGS. 29 and 30 are schematic views, respectively from above and below, of the hydraulic unit of FIGS. 26-27.

The delivery inlet $\mathbf{23}_{IN}$ and the suction outlet $\mathbf{26}_{OUT}$ of unit 1 of FIGS. 26-31 can also be differently positioned. Referring for example to FIG. 29, it will be noted that the suction outlet $\mathbf{26}_{OUT}$ can in this case be defined directly at the duct 24, in particular at the upper side thereof, and how the delivery inlet $\mathbf{23}_{IN}$ can be oriented towards the outlet end of unit 1 (i.e., the end equipped with the valve assemblies 41-43). As can be seen, therefore, the delivery inlet $\mathbf{23}_{IN}$ and the suction outlet $\mathbf{26}_{OUT}$ are located in a generally central region of unit 1, or in respective positions of the body 20 that are intermediate to the two longitudinal ends of the body itself.

Given the different conformation and arrangement of ducts 22 and 23, the seats 22*a*, 23*a* and the corresponding plugs 22*b*, 23*b* can also be arranged differently with respect to the case of FIGS. 1-25. Also in the case of FIGS. 26-31 the seats 22*a*, 23*a* are defined substantially in a position corresponding to an axial end of the duct 22, 23, respectively, opposite to the corresponding inlet. In the case of FIGS. 26-31, however, although they are still in fluid communication with the ducts 22 and 23, the seats 22*a* and 23*a* extend vertically at the upper side of unit 1 or body 20, as clearly visible for example in FIGS. 26, 27 and 31, and without prejudice to their functions of housing the non-return valves 51 and 52-53, which are associated to the plugs 22*b* and 23*b*, respectively, as clearly visible for example in FIG. 31. From the same FIG. 31 it is noted that, in embodiments of this type, the gas outlet $\mathbf{32}_{OUT}$ and the pressurized water outlet $\mathbf{33}_{OUT}$ can be defined at the bottom of the same seats 22*a* and 23*a*, respectively.

Figure 30:
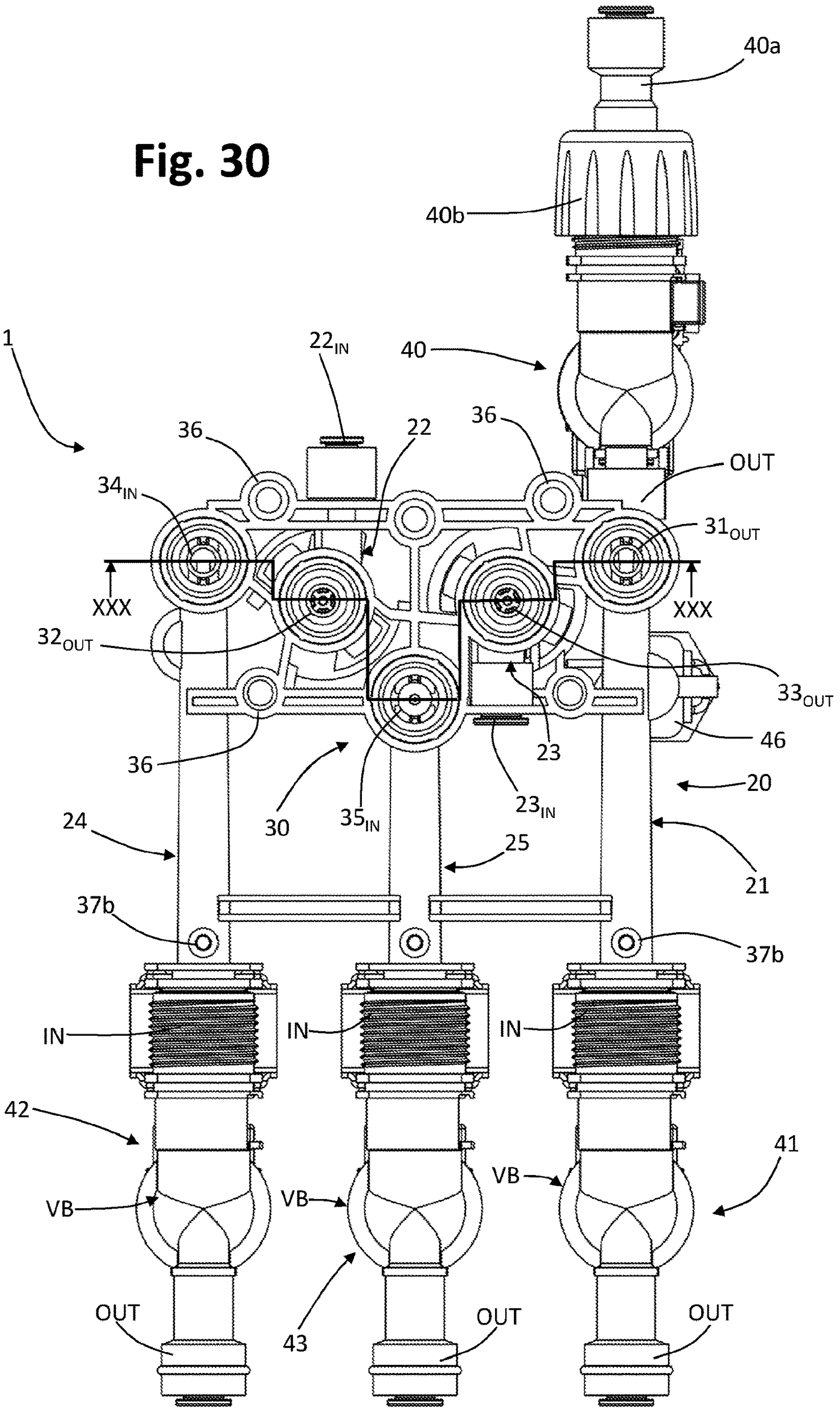
Figure 31:
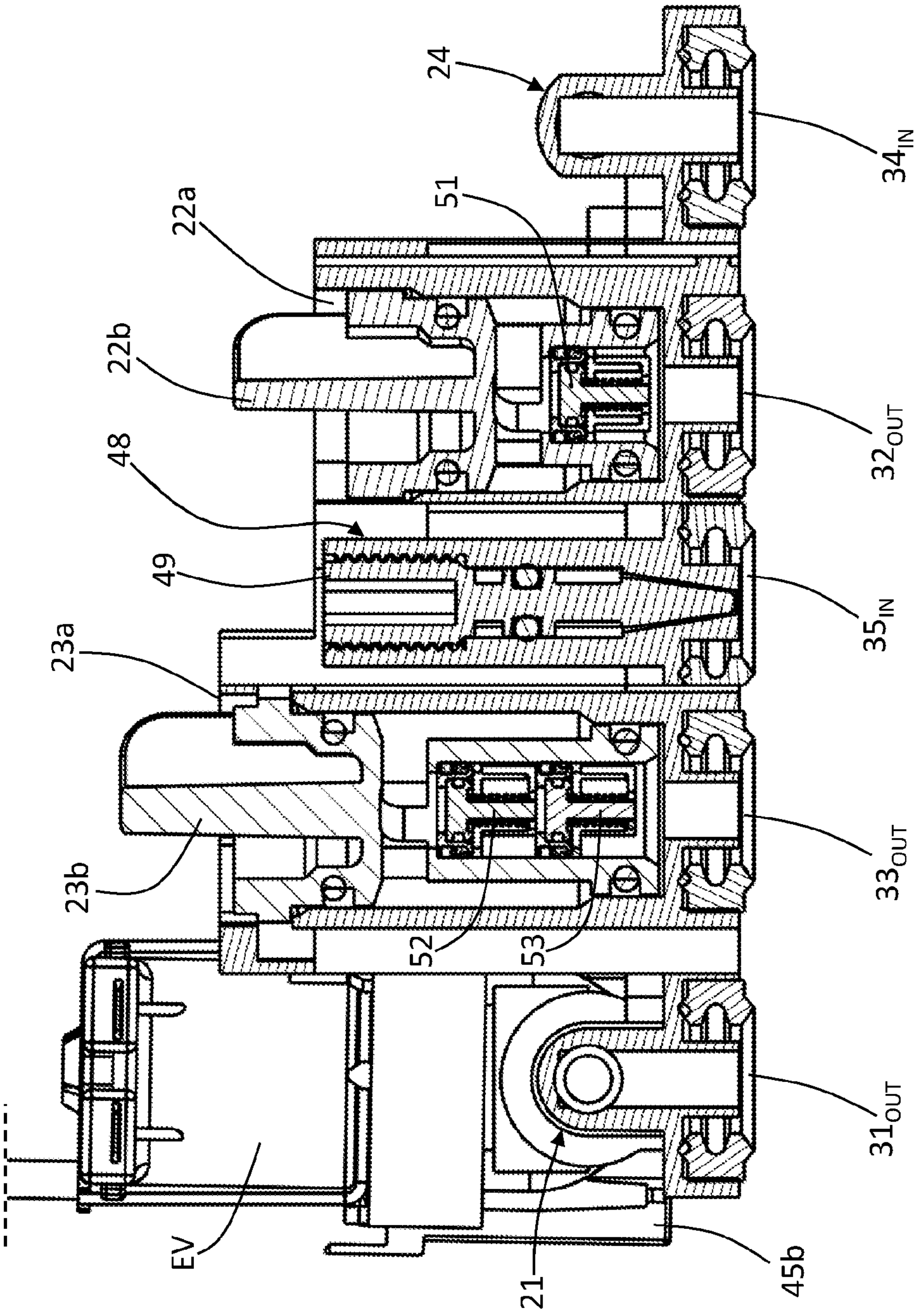
FIG. 31 is a schematic section according to line XXX-XXX of FIG. 30.

The features and functionalities described above for the connection interface 30 remain valid in the case of the unit 1 of FIGS. 26-31, as can be seen for example from FIG. 30. From this figure it can be noticed that the arrangement of the outlets $\mathbf{31}_{OUT}$, $\mathbf{32}_{OUT}$, $\mathbf{33}_{OUT}$ and the inlets $\mathbf{34}_{IN}$, $\mathbf{35}_{IN}$ of the interface 30 may be different from the one exemplified in FIG. 8, for example in view of a different arrangement of the inlets 6*a*-6*c* and the outlets 6*d*-6*e* of the carbonator (see FIG. 3 as a reference).

Figure 32:
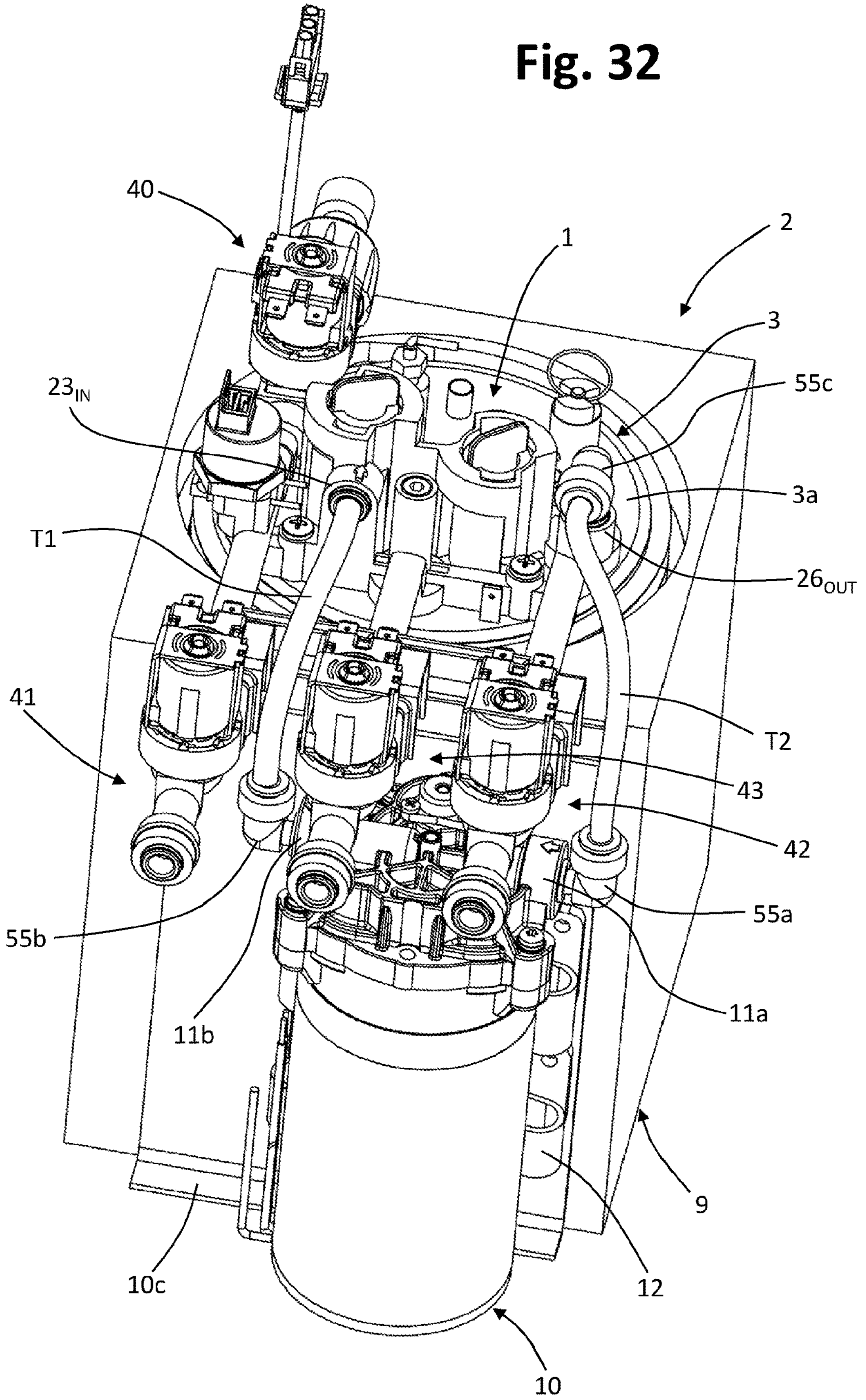
FIGS. 32 and 33 are schematic perspective views, similar to those of FIGS. 1-2, with a hydraulic unit of the type shown in FIGS. 26-31.
Figure 33:
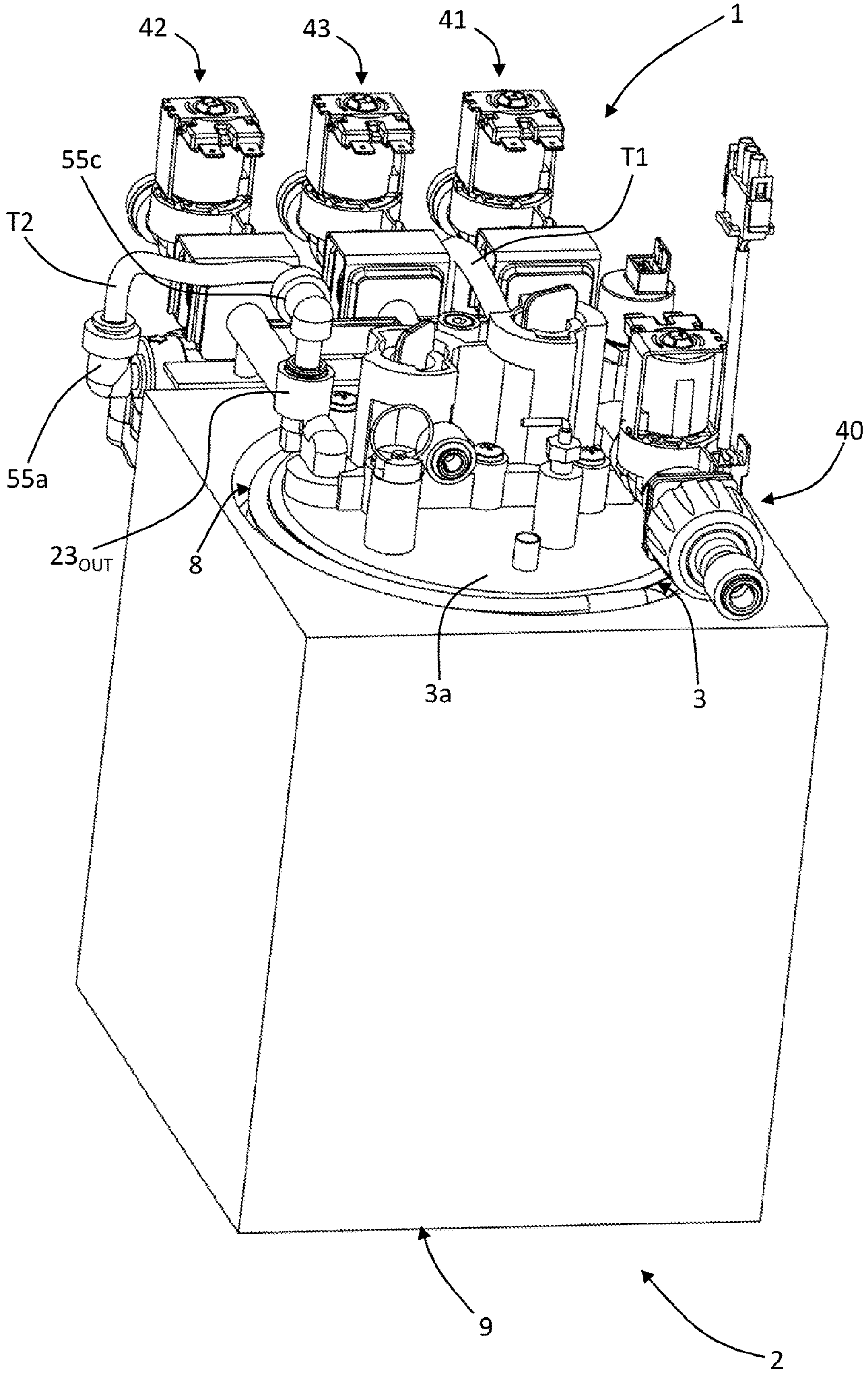

FIGS. 32 and 33 illustrate a mounted condition of unit 1 of FIGS. 26-31 on a carbonator 3 of a dispenser 2 of the type already indicated above, equipped with a corresponding pump 10.

In this case, the pump 10 is located on the insulation body 9 of the dispenser 2 at the outlet end of group 1, i.e., the end thereof including the valve assemblies 41-43, although this is not an essential feature. From these figures it is also possible to notice the fluidic connection of the pump 10 to the unit 1 by means of pipes, indicated with T1 and T2, preferably at least partly flexible pipes.

As particularly visible in FIG. 32, the pipe T1 connects the outlet 11*b* of the pump 10 to the delivery inlet $\mathbf{23}_{IN}$ of the unit 1, while the pipe T2 connects the input 11*a* of the pump 10 to the suction outlet $\mathbf{26}_{OUT}$ of the unit 1. In the example, the connection of the pipes T1 and T2 to the outlet and inlet of the pump 10 is achieved using quick-coupling fittings, for example of the type previously indicated with 55*b* and 55*a*, respectively, although this does not constitute an essential characteristic; a similar fitting, such as the one indicated with 55*c*, can be used for the connection of the pipe T2 to the outlet $\mathbf{26}_{OUT}$ of group 1. A similar fitting could possibly also be used for the connection of the pipe T1 to the inlet 23N of unit 1.

The functionalities of the unit 1 of FIGS. 26-31 are the same as those described above with reference to the embodiments of FIGS. 1-25.

Also in the case of the embodiments of FIGS. 26-31, the hydraulic unit 1 could be designed for use on cooler-carbonators equipped, for example, with taps that can be manually operable by the user. In this perspective, one or more ducts 21, 24 and 25 of the body 20 of unit 1 could have a modified shape, also at the corresponding inlets and/or outlets, similarly to what has been described above with reference to FIGS. 23 and 24. In the same way, also the body 20 of unit 1 of FIGS. 26-31 could have associated thereto one or more extension elements, to obtain configurations without one or more valve assemblies, similarly to what has been described above with reference to FIG. 25.

Presence of the pressure transducer 47 and/or the flow meter 45*a*-45*c* shall be considered optional in all embodiments.

It is clear that numerous variants are possible for the person skilled in the art to the hydraulic unit described as an example, without departing from the scope of the invention as defined by the claims that follow.

The invention claimed is:

1. A hydraulic unit for a carbonation apparatus having a carbonator and a pump, wherein the hydraulic unit has a body made of polymeric material defining a plurality of ducts, which comprise a duct to convey water to the carbonator, a duct to add a gas to the carbonator, and at least one duct to draw water from the carbonator, wherein the plurality of ducts comprises a plurality of ducts selected from among:

- a first duct, having a first supply inlet, configured for connection to a water supply source, and a first dispensing outlet,
- a second duct, having a second supply inlet, configured for connection to a gas supply source,
- a third duct, for introduction of pressurized water into the carbonator, having a delivery inlet configured for connection to an outlet of the pump,
- a fourth duct, having a second dispensing outlet, for cooled water, susceptible of fluidic connection with an inlet of the pump, and
- a fifth duct, having a third dispensing outlet, for carbonated water, and wherein the first supply inlet and the second supply inlet are at, or oriented towards, a first longitudinal end region of the body of polymeric material, and the first dispensing outlet, the second dispensing outlet and the third dispensing outlet are at a second longitudinal end region of the body of polymeric material which is opposite to the first longitudinal end region.

2. The hydraulic unit according to claim 1, wherein the body made of polymeric material also defines a fluidic connection interface, configured for mounting the body made of polymeric material at one connection end of the carbonator.

3. The hydraulic unit according to claim 2, wherein the fluidic connection interface has at least one outlet configured for fluidic connection to a water inlet of the carbonator, one outlet configured for fluidic connection to a gas inlet of the carbonator, and at least one inlet configured for fluidic connection to a water outlet of the carbonator.

4. The hydraulic unit according to claim 2, wherein the fluidic connection interface defines one or more inlets and one or more outlets selected from among:

a water outlet, which is configured for connection to a respective first inlet of the carbonator, a gas outlet, which is configured for connection to a respective second inlet of the carbonator, a pressurised water outlet, which is configured for connection to a respective third inlet of the carbonator, a cooled water inlet, which is configured for connection to a respective first outlet of the carbonator, and a carbonated water inlet, which is configured for connection to a respective second outlet of the carbonator.

5. The hydraulic unit according to claim 4, wherein the fluidic connection interface is defined at one side of the body made of polymeric material, and comprises a plurality of fluidic connections, and wherein the fluidic connections define at least two from among the water outlet, the gas outlet, the pressurised water outlet, the cooled water inlet and the carbonated water inlet.

6. The hydraulic unit according to claim 5, wherein the fluidic connections have respective interface sides that lie substantially on one and the same plane and/or each define a respective seat for a gasket, configured to obtain a seal with respect to an end surface of the carbonator.

7. The hydraulic unit according to claim 2, wherein the fluidic connection interface is defined at one side of the body made of polymeric material, and comprises a plurality of fluidic connections.

8. The hydraulic unit according to claim 7, wherein the fluidic connection interface comprises a plurality of mechanical connections, configured for mechanical fixing of the body made of polymeric material to the carbonator, and wherein the fluidic connections and the mechanical connections are mechanically interconnected with each other, by means of body portions or walls of the body made of polymeric material, to form a substantially lattice structure.

9. The hydraulic unit according to claim 7, wherein the fluidic connections have respective interface sides that lie substantially on one and the same plane and/or each define a respective seat for a gasket, configured to obtain a seal with respect to an end surface of the carbonator.

10. The hydraulic unit according to claim 2, wherein the fluidic connection interface comprises a plurality of mechanical connections, configured for mechanical fixing of the body made of polymeric material to the carbonator.

11. The hydraulic unit according to claim 10, wherein the mechanical connections lie substantially on one and the same plane.

12. The hydraulic unit according to claim 1, wherein the body made of polymeric material also defines at least one inlet and at least one outlet configured for connection to an outlet and an inlet, respectively, of the pump of the carbonation device.

13. The hydraulic unit according to claim 1, wherein the body made of polymeric material defines at least one of the following:

a plurality of first support elements configured for local rest without mechanical constraints of the body made of polymeric material on the carbonator, the first support elements having respective resting ends that lie substantially on one and the same plane;

a plurality of second support elements configured for local rest without mechanical constraints on a stationary structure of the carbonation apparatus, the second support elements preferably having respective resting ends that lie substantially on one and the same plane.

14. The hydraulic unit according to claim 13, wherein:

the first support elements have respective resting ends that lie substantially on one and the same plane; or the second support elements have respective resting ends that lie substantially on one and the same plane.

15. The hydraulic unit according to claim 1, wherein the plurality of ducts also includes a sixth duct, having a suction outlet, configured for connection with the inlet of the pump, the sixth duct being in fluid communication with the fourth duct, and wherein the suction outlet and the delivery inlet are substantially at the first longitudinal end region.

16. A carbonation apparatus having a carbonator and a pump, comprising a hydraulic unit according to claim 1.

17. A hydraulic unit for a carbonation apparatus having a carbonator and a pump, wherein the hydraulic unit has a body made of polymeric material defining a plurality of ducts, which comprise a duct to convey water to the carbonator, a duct to add a gas to the carbonator, and at least one duct to draw water from the carbonator, wherein the plurality of ducts comprises a plurality of ducts selected from among:

a first duct, having a first supply inlet, configured for connection to a water supply source, and a first dispensing outlet, a second duct, having a second supply inlet, configured for connection to a gas supply source, a third duct, for introduction of pressurized water into the carbonator, having a delivery inlet configured for connection to an outlet of the pump, a fourth duct, having a second dispensing outlet, for cooled water, susceptible of fluidic connection with an inlet of the pump, a fifth duct, having a third dispensing outlet, for carbonated water, wherein the body made of polymeric material also defines a fluidic connection interface, configured for mounting the body made of polymeric material at one connection end of the carbonator, wherein the fluidic connection interface defines one or more inlets and one or more outlets selected from among:

a water outlet, which is configured for connection to a respective first inlet of the carbonator, a gas outlet, which is configured for connection to a respective second inlet of the carbonator, a pressurised water outlet, which is configured for connection to a respective third inlet of the carbonator, a cooled water inlet, which is configured for connection to a respective first outlet of the carbonator, and a carbonated water inlet, which is configured for connection to a respective second outlet of the carbonator, and wherein:

the water outlet is in fluid communication with the first duct in an intermediate position between the first supply inlet and the first dispensing outlet, the gas outlet is in fluid communication with the second duct;

the pressurised water outlet is in fluid communication with the third duct, the cooled water inlet is in fluid communication with the fourth duct, and the carbonated water inlet is in fluid communication the fifth duct.

18. The hydraulic unit according claim 17, where the first supply inlet and the second supply inlet are at, or oriented towards, a first longitudinal end region of the body of polymeric material, and the first dispensing outlet, the second dispensing outlet and the third dispensing outlet are at a second longitudinal end region of the body of polymeric material which is opposite to the first longitudinal end region.

19. A hydraulic unit for a carbonation apparatus having a carbonator and a pump, wherein the hydraulic unit has a body made of polymeric material defining a plurality of ducts, which comprise a duct to convey water to the carbonator, a duct to add a gas to the carbonator, and at least one duct to draw water from the carbonator, wherein the plurality of ducts comprises a plurality of ducts selected from among:

a first duct, having a first supply inlet, configured for connection to a water supply source, and a first dispensing outlet, a second duct, having a second supply inlet, configured for connection to a gas supply source, a third duct, for introduction of pressurized water into the carbonator, having a delivery inlet configured for connection to an outlet of the pump, a fourth duct, having a second dispensing outlet, for cooled water, susceptible of fluidic connection with an inlet of the pump, and a fifth duct, having a third dispensing outlet, for carbonated water, and wherein:

the plurality of ducts also includes a sixth duct, having a suction outlet, configured for connection with the inlet of the pump, the sixth duct being in fluid communication with the fourth duct, a cooled water inlet, which is configured for connection to a respective first outlet of the carbonator, is in fluid communication with the fourth duct in an intermediate position between the second outlet and a connection between the fourth duct and the sixth duct.

* * * * *